US011680833B2

(12) United States Patent
Steven

(10) Patent No.: US 11,680,833 B2
(45) Date of Patent: Jun. 20, 2023

(54) FLOW METERING

(71) Applicant: Richard Steven, Johnstown, CO (US)

(72) Inventor: Richard Steven, Johnstown, CO (US)

(*) Notice: Subject to any disclaimer, the term of this patent is extended or adjusted under 35 U.S.C. 154(b) by 969 days.

(21) Appl. No.: 14/889,010

(22) PCT Filed: Apr. 9, 2014

(86) PCT No.: PCT/GB2014/051101
§ 371 (c)(1),
(2) Date: Nov. 4, 2015

(87) PCT Pub. No.: WO2014/181076
PCT Pub. Date: Nov. 13, 2014

(65) Prior Publication Data
US 2016/0084687 A1 Mar. 24, 2016

(30) Foreign Application Priority Data

May 4, 2013 (GB) ..................... 1308106
May 20, 2013 (GB) ..................... 1309006

(51) Int. Cl.
G01F 1/34 (2006.01)
G01F 1/74 (2006.01)
G01F 15/04 (2006.01)
G01F 1/36 (2006.01)
(Continued)

(52) U.S. Cl.
CPC ............ *G01F 1/34* (2013.01); *G01F 1/74* (2013.01); *G01F 15/04* (2013.01); *G01F 1/363* (2013.01); *G01F 25/00* (2013.01); *G01F 25/10* (2022.01); *G01F 25/15* (2022.01)

(58) Field of Classification Search
None
See application file for complete search history.

(56) References Cited

U.S. PATENT DOCUMENTS 4,576,043 A 3/1986 Nguyen
4,662,219 A 5/1987 Nguyen
(Continued)

FOREIGN PATENT DOCUMENTS

GB 2266597 A * 11/1993 ............. G01F 1/363
WO 2009012230 A1 1/2009

OTHER PUBLICATIONS

Rabone et al NPL (Rabone, Jennifer; Peebles, Bob; Kidd, George; Safonov, Andrey; Khairullin, Ilnur; and Kinney, Josh.—"Advanced DP Meter Diagnostics—Developing Dynamic Pressure Field Monitoring (& Other Developments); 32nd International North Sea Flow Measurement Workshop Oct. 21-24, 2014". (Year: 2014).*
(Continued)

*Primary Examiner* — Arleen M Vazquez
*Assistant Examiner* — Leonard S Liang
(74) *Attorney, Agent, or Firm* — Jordan IP Law, LLC; Todd A. Vaughn

(57) ABSTRACT

A new DP meter diagnostic system for wet gas flow builds on existing diagnostic techniques. Based on new diagnostic parameters and calculations derived from them, blocked pressure ports or impulse lines can be identified or wet gas established as the cause of an abnormal reading. Further diagnostic techniques can take advantage of the new diagnostic parameters to predict a liquid loading parameter, gas flow rate and fluid flow rate for wet gas flow.

23 Claims, 12 Drawing Sheets

(51) Int. Cl.
G01F 25/10 (2022.01)
G01F 25/00 (2022.01)

(56) References Cited

U.S. PATENT DOCUMENTS

| | | | | |
|---|---|---|---|---|
| 5,504,692 | A * | 4/1996 | Gardner | G01F 15/068 700/266 |
| 5,750,903 | A * | 5/1998 | Ryhanen | G01F 1/383 73/861.48 |
| 6,345,536 | B1 * | 2/2002 | Morrison | G01F 1/50 73/861.04 |
| 6,382,032 | B1 * | 5/2002 | Hatton | G01F 1/74 73/861.04 |
| 6,422,092 | B1 * | 7/2002 | Morrison | G01F 1/50 73/861.04 |
| 6,546,811 | B2 * | 4/2003 | Fincke | G01F 1/44 73/861.63 |
| 6,612,187 | B1 * | 9/2003 | Lund | G01F 1/36 73/861.04 |
| 8,136,414 | B2 * | 3/2012 | Steven | G01F 1/3209 73/861.63 |
| 2002/0139197 | A1 * | 10/2002 | Salamitou | G01F 1/44 73/861.04 |
| 2004/0210404 | A1 * | 10/2004 | Gysling | G01F 1/74 702/50 |
| 2005/0034535 | A1 * | 2/2005 | Sprague | G01F 1/86 73/861.22 |
| 2005/0132808 | A1 * | 6/2005 | Brown | G01L 19/0015 73/592 |
| 2007/0006744 | A1 * | 1/2007 | Gysling | G01F 1/36 99/486 |
| 2007/0294039 | A1 * | 12/2007 | Gysling | G01F 1/666 702/24 |
| 2008/0006094 | A1 * | 1/2008 | Schulte | G01F 1/34 73/736 |
| 2008/0236298 | A1 * | 10/2008 | Gysling | G01F 1/36 73/861.42 |
| 2008/0300792 | A1 * | 12/2008 | Lakhani | G01F 1/50 702/12 |
| 2008/0300802 | A1 * | 12/2008 | Lakhani | G01F 1/44 702/45 |
| 2009/0088985 | A1 * | 4/2009 | Wee | G01F 1/74 702/30 |
| 2009/0211369 | A1 * | 8/2009 | Unalmis | G01F 1/708 73/861.61 |
| 2009/0229377 | A1 * | 9/2009 | Ushigusa | G01F 15/18 73/861.61 |
| 2010/0191481 | A1 * | 7/2010 | Steven | G01F 1/3209 702/47 |
| 2010/0224009 | A1 * | 9/2010 | Steven | G01F 1/3218 73/861.42 |
| 2012/0222494 | A1 * | 9/2012 | Wehrs | G01F 1/36 73/861.52 |
| 2014/0025317 | A1 * | 1/2014 | Satou | G01L 27/007 702/50 |
| 2014/0331786 | A1 * | 11/2014 | Romano | A61M 16/0051 73/861.52 |

OTHER PUBLICATIONS

Dave Wehrs, Detection of Plugged Impulse Lines Using Statistical Process Monitoring Technology, Dec. 2006, 7 pages, Emerson Process Management, Rosemount Inc., Chanhassen, Minnesota.

Dave Wehrs et al., Wet Gas Diagnostic with Intelligent Differential Pressure Transmitter, Jan. 2008, 9 pages, Emerson Process Management, Rosemount, Inc.

Haluk Toral et al., "A Method for Characterization of the Turbulence Properties of Wet Gas Flow Across a V-Cone", Sep. 2004, 6 pages, Flomenko, Guilin, China.

Haluk Toral et al., "Characterization of the Turbulence Properties of Wet Gas Flow in a V-Cone Meter with Neural Nets", North Sea Flow Measurement Workshop, Oct. 26-29, 2004, 18 pages, NEL.

Kick De Leeuw, "Liquid Correction of Venturi Meter Readings in Wet Gas Flow", North Sea Measurement Workshop 1997, 19 pages.

Richard Steven et al., "Liquid Property and Diameter Effects on Venturi Meters Used with Wet Gas Flows", International Fluid Flow Measurement Symposium, May 2006, 19 pages, Mexico.

Michael Reader-Harris et al., "Ventuti-Tube Performance in Wet Gas Using Different Test Fluids", 24th International North Sea Flow Measurement Workshop, Oct. 24-27, 2006, 20 pages, St Andrews, Scotland, UK.

David Stewart et al., "Wet Gas Metering with V-Cone Meters", North Sea Flow Measurement Workshop, Oct. 22-25, 2002, 20 pages, Paper No. 4.2, St Andrews, Scotland, UK.

David G. Stewart, "Application of Differential Pressure Meters to Wet Gas Flow", 2nd International South East Asia Hydrocarbon Flow Measurement Workshop, Mar. 25-28, 2003, 18 pages, Paper 8.2.

Charles Britton et al., "A Review of the Parameters Influencing Venturi Meters with Wet Gas Flows", North Sea Flow Measurement Workshop 2008, 29 pages, St Andrews, Scotland, UK.

Richard Steven et al., "Wedge Meters with Wet Natural Gas Flows" International Symposium of Fluid Flow Measurement, 2009, 19 pages, Alaska, USA.

Richard Steven et al., "Horizontally Installed Orifice Plate Meter Response to Wet Gas Flows", North Sea Flow Measurement Workshop, Oct. 2011, 33 pages, Tonsberg, Norway.

Ian Wood et al., "Penguin Dualstream II Wet Gas Measurement", North Sea Flow Measurement Workshop, Oct. 28-31, 2003, 22 pages, Tonsberg, Norway.

Richard Steven, "V-Cone Wet Gas Metering", North Sea Flow Measurement Workshop 2007, 29 pages, Oslo, Norway.

Jennifer Rabone et al., "DP Meter Diagnostic Systems—Operator Experience", 30th International North Sea Flow Measurement Workshop, Oct. 23-26, 2012, 32 pages, St Andrews, Scotland, UK.

Richard Steven, "Wet Gas Metering", Thesis for Degree of Doctor of Philosophy, Apr. 2001, 303 pages, University of Strathclyde Department of Mechanical Engineering, Glasgow, UK.

Malaysian Examination Report dated May 29, 2019.

* cited by examiner

PRIOR ART

FLOW METERING

CROSS REFERENCE TO PRIOR APPLICATIONS

The present application is a National Stage Application of PCT International Application No. PCT/GB2014/051101 (filed on Apr. 9, 2014), under 35 U.S.C. 371, which claims priority to Great Britain Patent Application No. 1308106.2 (filed on May 4, 20013) and Great Britain Patent Application No. 1309006.3 (filed on May 20, 20013), which are each hereby incorporated by reference in their respective entireties.

The present disclosure relates to improvements in or relating to flow metering, and in particular to methods of metering flow, differential pressure (DP) meters and meter systems, and associated computer program products and flow computers.

The metering of fluid flows is a vital part of many engineering processes. In the case of hydrocarbon production wells a fluid flow meter records the rate of production and therefore directly records the monetary flow from the well in question. Accurate knowledge of production flow rates from flow meters is required to optimize and control production from hydrocarbon production wells, and hence, optimize the financial return on any given hydrocarbon well. Clearly, it is important for industry to have as accurate and reliable a flow meter as possible for many applications.

One important class of flow meters are differential pressure (DP) flow meters. In the basic sense, a DP flow meter combines Bernoulli's theorem (i.e. the conservation of energy of a fluid flow) and the conservation of mass of a fluid flow between two points in a flow, and the difference in pressure between these two points is measured so that a mass or volume flow rate can be expressed as a function of this differential pressure.

A DP meter comprises an obstruction to fluid flow and means for measuring the pressure change caused by the obstruction, giving associated flow rate equations for either volume flow rate or mass flow rate. The obstruction is characterised by a "primary element" which can be either a constriction formed in a fluid conduit or a structure inserted into the conduit. The primary element can be for example a Venturi constriction, an orifice plate, a cone shaped element or other form.

A typical means for measuring the pressure change is a DP transmitter. This device comprises a transmitter head and two pressure ports. In use, one of the pressure port is designated as a "high" pressure port and the other as a "low" pressure port. The transmitter head pressure ports are coupled with openings in a fluid conduit, which are also known as pressure ports or alternatively as pressure tappings, via piping elements known as impulse lines. The transmitter head comprises a pressure sensor element that is in fluid communication with the high and low pressure impulse lines and acts in conjunction with appropriate circuitry to convert the difference in the two pressures into an electronic signal, which can be transmitted to a flow computer for further analysis. The flow computer may be incorporated into the DP transmitter head. The flow computer may be a dedicated flow computer instrument, which will typically have a simple LCD display and dedicated push button functions, with a processing unit designed specifically for performing flow calculations. Alternatively, the flow computer may comprise a general purpose computer running a program that performs analysis on the data and provides a graphical user interface for interrogating the data and optionally sending command and control signals to the DP transmitters. The connection to the flow computer may be wired or wireless, using any chosen communications and network technology such as ethernet or Wi-Fi together with internet or intranet computer networks. Appropriate network interfaces and/or data transmission components can be incorporated into the DP transmitter head according to the chosen communications method. Thus, the flow computer may be provided close to the DP transmitters, or may be provide remote from the DP transmitters.

Various different types of DP transmitter are available. One common example is to have a pressure sensor element comprising a diaphragm and a strain gauge sensor. Another common example is to have a deflectable diaphragm between two fixed plates and measure the difference in capacitance due to the deflection on the diaphragm caused by the DP. The present disclosure is not limited to any particular type of DP transmitter.

In this disclosure, the term "DP meter" will generally be used as a short-hand notation for a DP metering system, unless otherwise stated. Thus, a DP meter may comprise a primary element, one or more DP transmitters, and two or more fluid conduit pressure ports. As noted above, a DP meter will usually provide data to an instrument or a computer for further analysis.

DP meters are deployed in a wide range of areas, and may often be used in environmentally hostile environments or distributed over a wide geographical area. Therefore, maintenance and repair of DP meters can be time consuming and costly. Presently, industry tends to rely on routine scheduled maintenance, and DP meters without diagnostics can malfunction and give erroneous flow rate predictions without this being noticed. Industry is now beginning to adopt remotely gathered diagnostic information in order to detect DP meters that are not functioning correctly. The first challenge is to notice that a problem is there in the first place. Thereafter, it is desirable to have more information about the nature of the problem, so that the appropriate corrections can be made to the data that is being read, and for appropriate maintenance or repair actions to be carried out.

A diagnostic system is disclosed in GB 2453704 and U.S. Pat. No. 8,136,414, both of which are incorporated herein by reference. This system uses a DP meter as illustrated in FIG. 1. This is a so-called Venturi meter, which is one example DP meter design. In this type of DP meter, the primary element is formed by a constriction in a fluid conduit which has a narrowest point or "throat", 102. Flow is in the direction of the arrow shown. Three pressure ports are provided; an upstream port 104, mid-stream port 106 and downstream port 108. Ports 104 and 108 are "upstream" and "downstream" with respect to the throat 102, and preferably with respect to the entire venturi constriction portion of the fluid conduit 100. In general (for all types of DP meter), the positions of the upstream and downstream pressure ports will be defined with respect to the primary element of the meter.

The impulse lines connecting the three pressure ports and the three DP transmitters are coupled so that the upstream fluid conduit pressure port 104 is shared between pressure ports of the "traditional" DP transmitter head 110 and the permanent pressure loss ("PPL") DP transmitter head 112; the mid-stream fluid conduit pressure port 106 is shared between pressure ports of the "traditional" DP transmitter head 110 and the "recovery" DP transmitter head 114; the downstream fluid conduit pressure port 108 is shared between pressure ports of the "recovery" DP transmitter head 114 and the "PPL" DP transmitter head 112. The coupling of the impulse lines may be achieved by a manifold or appropriate branch fittings such as T-joints.

Readings from the three ports 104, 106, 108 provide three different differential pressure readings. The three DPs are, the upstream to mid-stream DP (the 'traditional DP', $\Delta P_1$), the downstream to mid-stream DP (the 'recovered DP', $\Delta P_r$) and upstream to downstream DP (the 'permanent pressure loss' or 'PPL' DP, $\Delta P_{PPL}$).

From these three DPs a DP Meter diagnostic system was created, which monitors the DP meters performance. When this diagnostic system indicates a DP meter problem it produces a 'short list' of the possible problems that could cause such a diagnostic response. For example, if a DP meter installed for gas service encountered 'wet gas' flow (i.e. there was liquids entrained with the gas) then the DP meter diagnostic system indicates a problem, and a gives a shortlist of the problems that could cause that diagnostic result. The short list would in this example include 'wet gas flow'.

Wet gas flow is a problematic area for many reasons. The composition of the flow can vary which makes accurate metering difficult. The liquid induces a bias on the DP meter's gas flow rate prediction. Furthermore, wet gas flow can cause blockage of pressure ports and/or impulse lines of a DP meter. For example, water based wet natural gas flows can cause the formation of hydrates, salt or scale deposits that cause blockages.

It would be advantageous to have a diagnostic system that can detect a blocked pressure port or impulse line. It would also be advantageous to have a diagnostic system that can distinguish wet from dry flows, and/or be able to distinguish between a blocked pressure port or impulse line and a wet gas flow, and/or to provide improved methods for predicting gas and/or liquid flow rates.

According to a first aspect of the disclosure there is provided a method of metering flow through a fluid conduit comprising a fluid obstruction means, comprising the steps of:

measuring a permanent pressure loss (PPL) differential pressure taken between a position upstream of the fluid obstruction means and a position downstream of the fluid obstruction means;

measuring a traditional differential pressure taken between the position upstream of the fluid obstruction means and an intermediate position between the upstream and downstream positions;

measuring a recovered differential pressure taken between the intermediate position and the downstream position;

deriving a signal variation parameter for each of the three measured differential pressures;

comparing each of the three derived signal variation parameters against their respective maximum thresholds; and identifying any differential pressure measurement that has an associated signal variation parameter with a magnitude greater than the expected maximum threshold.

The expected maximum threshold is a value that corresponds to an expected maximum signal variation for a single phase flow.

Optionally, the method comprises monitoring the differential pressures through repeated differential pressure measurements.

Regular repeated measurements can be logged, thus building up a data set of the differential pressures over time.

Optionally, the signal variation parameter is a standard deviation.

Optionally, each differential pressure measurement is derived by comparing the pressures of a first dedicated fluid channel formed between a first pressure port of a DP transmitter and a first fluid conduit pressure port and a second dedicated fluid channel formed between a second pressure port of a DP transmitter and a second fluid conduit pressure port.

Optionally, a differential pressure measurement is identified as trustworthy if it is not identified as having an associated signal variation parameter that is greater than the expected maximum value, and a fluid flow rate is calculated on the basis of the or each of the differential pressure measurements that are identified as trustworthy.

Optionally, the fluid conduit comprises three pressure ports which are each coupled with pressure ports of two different DP transmitters.

Optionally, the method comprises:

measuring said PPL differential pressure with a first DP transmitter comprising a first pressure port coupled with an upstream fluid conduit pressure port and a second pressure port coupled with a downstream fluid conduit pressure port;

measuring said traditional differential pressure with a second DP transmitter comprising a first pressure port coupled with said upstream fluid conduit pressure port and a second pressure port coupled with an intermediate fluid conduit pressure port; and measuring said recovered differential pressure with a third DP transmitter comprising a first pressure port coupled with said intermediate fluid conduit pressure port and a second pressure port coupled with said downstream fluid conduit pressure port.

Optionally, if two of the three differential pressure measurements are identified as having a greater than expected signal variation parameter, then the fluid conduit pressure port that is shared between the two DP transmitters that measure those two differential pressure measurements is identified as being blocked.

Optionally, when the traditional and the permanent pressure loss differential pressure measurements are both identified as having a greater than expected signal variation parameter, a blocked upstream pressure port is diagnosed.

Optionally, when the traditional and the recovered differential pressure measurements are both identified as having a greater than expected signal variation parameter, a blocked intermediate pressure port is diagnosed.

Optionally, when the recovered and the permanent pressure loss differential pressure measurements are both identified as having a greater than expected signal variation parameter, a blocked downstream pressure port is diagnosed.

Optionally, a differential pressure measurement is identified as trustworthy if it is not identified as having an associated signal variation parameter that is greater than the expected maximum value, and a fluid flow rate is calculated on the basis of one differential pressure measurement that is identified as trustworthy.

Optionally, the calculated fluid flow rate from the DP identified as trustworthy is then compared with the two differential pressure measurement flow rate predictions corresponding to differential pressure measurements identified as having an associated signal variation parameter that is greater than the expected maximum value, the difference yielding both the flow rate and associated DP errors.

Optionally, if all three of the differential pressure measurements are identified as having a greater than expected signal variation parameter, the fluid flow is identified as being a wet gas flow.

Optionally, the method comprises generating an alarm or warning signal if a differential pressure measurement having a greater than expected signal variation parameter is identified.

According to a second aspect of the disclosure there is provided a differential pressure (DP) meter system comprising:

a fluid conduit comprising a fluid obstruction means and a plurality of pressure ports a first DP transmitter for measuring a permanent pressure loss (PPL) differential pressure taken between a position upstream of the fluid obstruction means and a position downstream of the fluid obstruction means;

a second DP transmitter for measuring a traditional differential pressure taken between the position upstream of the fluid obstruction means and an intermediate position between the upstream and downstream positions;

a third DP transmitter for measuring a recovered differential pressure taken between the intermediate position and the downstream position; and calculation means for deriving a signal variation parameter for each of the three measured differential pressures; comparing each of the three derived signal variation parameters against their respective maximum thresholds; and identifying any differential pressure measurement that has an associated signal variation parameter with a magnitude greater than the expected maximum threshold.

The "calculation means" can also be termed as a "calculator" and may be a computer processor or equivalent.

Optionally, the calculation means monitors the differential pressures through repeated differential pressure measurements.

Optionally, the calculation means comprises storage means for logging repeated measurements, thus building up a data set of the differential pressures over time.

Optionally, the signal variation parameter is a standard deviation.

Optionally, each DP transmitter comprises a first pressure port and a second pressure port; and each DP transmitter port is coupled to one fluid conduit pressure port to form a dedicated fluid channel.

Optionally, a differential pressure measurement is identified as trustworthy if it is not identified as having an associated signal variation parameter that is greater than the expected maximum value, and a fluid flow rate is calculated on the basis of the or each of the differential pressure measurements that are identified as trustworthy.

Optionally, the fluid conduit comprises three pressure ports which are each coupled with pressure ports of two different DP transmitters.

Optionally, the DP meter system comprises:

a first DP transmitter for measuring said PPL differential pressure and comprising a first pressure port coupled with an upstream fluid conduit pressure port and a second pressure port coupled with a downstream fluid conduit pressure port;

a second DP transmitter for measuring said traditional differential pressure and comprising a first pressure port coupled with said upstream fluid conduit pressure port and a second pressure port coupled with an intermediate fluid conduit pressure port; and a third DP transmitter for measuring said recovered differential pressure and comprising a first pressure port coupled with said intermediate fluid conduit pressure port and a second pressure port coupled with said downstream fluid conduit pressure port.

Optionally, if two of the three differential pressure measurements are identified as having a greater than expected signal variation parameter, then the fluid conduit pressure port that is shared between the two DP transmitters that measure those two differential pressure measurements is identified as being blocked.

Optionally, when the traditional and the permanent pressure loss differential pressure measurements are both identified as having a greater than expected signal variation parameter, a blocked upstream pressure port is diagnosed.

Optionally, when the traditional and the recovered differential pressure measurements are both identified as having a greater than expected signal variation parameter, a blocked intermediate pressure port is diagnosed.

Optionally, when the recovered and the permanent pressure loss differential pressure measurements are both identified as having a greater than expected signal variation parameter, a blocked downstream pressure port is diagnosed.

Optionally, a differential pressure measurement is identified as trustworthy if it is not identified as having an associated signal variation parameter that is greater than the expected maximum value, and a fluid flow rate is calculated on the basis of one differential pressure measurement that is identified as trustworthy.

Optionally, the calculated fluid flow rate from the DP identified as trustworthy is then compared with the two differential pressure measurement flow rate predictions corresponding to differential pressure measurements identified as having an associated signal variation parameter that is greater than the expected maximum value, the difference yielding both the flow rate and the corresponding DP errors.

Optionally, if all three of the differential pressure measurements are identified as having a greater than expected signal variation parameter, the fluid flow is identified as being a wet gas flow.

Optionally, the DP meter system comprises an alarm mechanism that generates an alarm or warning signal if a differential pressure measurement having a greater than expected signal variation parameter is identified.

According to a third aspect of the disclosure there is provided a computer program product comprising instructions that, when run on a flow computer, enable said flow computer to receive electronic signals representative of differential pressure measurements; to derive a signal variation parameter for each of the three measured differential pressures; compare each of the three derived signal variation parameters against their respective maximum thresholds; and identify any differential pressure measurement that has an associated signal variation parameter with a magnitude greater than the expected maximum threshold.

Optionally, differential pressures are monitored through repeated differential pressure measurements.

Optionally, the computer program product comprises instructions for logging repeated measurements, thus building up a data set of the differential pressures over time.

Optionally, the signal variation parameter is a standard deviation.

Optionally, each differential pressure measurement is derived from the metering of flow through a fluid conduit comprising a fluid obstruction means and a plurality of pressure ports, are derived by comparing the pressures of a first dedicated fluid channel formed between a first pressure port of a DP transmitter and a first fluid conduit pressure port and a second dedicated fluid channel formed between a second pressure port of a DP transmitter and a second fluid conduit pressure port.

Optionally, a differential pressure measurement is identified as trustworthy if it is not identified as having an associated signal variation parameter that is greater than the expected maximum value, and a fluid flow rate is calculated on the basis of the or each of the differential pressure measurements that are identified as trustworthy.

Optionally, each differential pressure measurement is derived from the metering of flow through a fluid conduit comprising a fluid obstruction means and three pressure ports which are each coupled with pressure ports of two different DP transmitters.

Optionally, the differential pressure measurements are derived from:

measuring said PPL differential pressure with a first DP transmitter comprising a first pressure port coupled with an upstream fluid conduit pressure port and a second pressure port coupled with a downstream fluid conduit pressure port;

measuring said traditional differential pressure with a second DP transmitter comprising a first pressure port coupled with said upstream fluid conduit pressure port and a second pressure port coupled with an intermediate fluid conduit pressure port; and measuring said recovered differential pressure with a third DP transmitter comprising a first pressure port coupled with said intermediate fluid conduit pressure port and a second pressure port coupled with said downstream fluid conduit pressure port.

Optionally, if two of the three differential pressure measurements are identified as having a greater than expected signal variation parameter, then the fluid conduit pressure port that is shared between the two DP transmitters that measure those two differential pressure measurements is identified as being blocked.

Optionally, when the traditional and the permanent pressure loss differential pressure measurements are both identified as having a greater than expected signal variation parameter, a blocked upstream pressure port is diagnosed.

Optionally, when the traditional and the recovered differential pressure measurements are both identified as having a greater than expected signal variation parameter, a blocked intermediate pressure port is diagnosed.

Optionally, when the recovered and the permanent pressure loss differential pressure measurements are both identified as having a greater than expected signal variation parameter, a blocked downstream pressure port is diagnosed.

Optionally, a differential pressure measurement is identified as trustworthy if it is not identified as having an associated signal variation parameter that is greater than the expected maximum value, and a fluid flow rate is calculated on the basis of one differential pressure measurement that is identified as trustworthy.

Optionally, the calculated fluid flow rate from the DP identified as trustworthy is then compared with the two differential pressure measurement flow rate predictions corresponding to differential pressure measurements identified as having an associated signal variation parameter that is greater than the expected maximum value, the difference yielding both the flow rate and associated DP errors.

Optionally, if all three of the differential pressure measurements are identified as having a greater than expected signal variation parameter, the fluid flow is identified as being a wet gas flow.

Optionally, the instructions, when run on a flow computer, enable said flow computer to generate an alarm or warning signal if a differential pressure measurement having a greater than expected signal variation parameter is identified.

According to a fourth aspect of the disclosure there is provided a flow computer arranged to receive electronic signals representative of differential pressure measurements; to derive a signal variation parameter for each of the three measured differential pressures; compare each of the three derived signal variation parameters against their respective maximum thresholds; and identify any differential pressure measurement that has an associated signal variation parameter with a magnitude greater than the expected maximum threshold.

The flow computer of the fourth aspect may be arranged to carry out any of the steps that are enabled by the computer program product of the third aspect, or as are otherwise described herein.

According to a fifth aspect of the disclosure there is provided a method of metering flow through a fluid conduit comprising a fluid obstruction means, comprising the steps of:

measuring a permanent pressure loss (PPL) differential pressure taken between a position upstream of the fluid obstruction means and a position downstream of the fluid obstruction means;

measuring a traditional differential pressure taken between the position upstream of the fluid obstruction means and an intermediate position between the upstream and downstream positions;

measuring a recovered differential pressure taken between the intermediate position and the downstream position;

fitting measurements comprising one or more of the measured differential pressures or data derived from one or more of the measured differential pressures to a liquid loading parameter, a pressure parameter and a gas flow rate parameter;

comparing a liquid loading parameter expression derived from said fitting to an over-reading correction factor expression;

and, by iteration of said combined expressions, determining the liquid loading parameter and determining a gas mass flow rate and/or a liquid mass flow rate.

Optionally, one or more of said liquid loading parameter, pressure parameter and gas flow rate parameters comprise dimensionless parameters.

Optionally, said liquid loading parameter comprises a Lockhart-Martinelli parameter.

Optionally, said pressure parameter comprises a gas to liquid density ratio.

Optionally, said gas flow rate parameter comprises a gas densitometric Froude number.

Optionally, deriving data from one or more of the measured differential pressures comprises calculating a flow rate prediction from one of the measured differential pressures.

Optionally, calculating a flow rate prediction from the measured differential pressures comprises calculating at least one from the group comprising: a permanent pressure loss (PPL) flow rate prediction derived from said PPL differential pressure; a traditional flow rate prediction derived from said traditional differential pressure; and a recovered flow rate prediction derived from said recovered differential pressure.

Optionally, said data derived from one or more of the measured differential pressures comprises ratios between any pair of the measured differential pressures.

Optionally, the determining of the gas mass flow rate, liquid mass flow rate and liquid loading comprises substituting a predicted liquid loading parameter expression into a wet gas correlation fitted for a flow rate prediction derived from any one of the traditional, recovered or PPL measurements to predict the gas flow rate, and iterating the resulting expression.

Optionally, the fitted measurements comprise the difference between, or a ratio between, the PPL and traditional flow rate predictions.

Optionally, the fitted measurements comprise the difference between, or a ratio between, the PPL and recovered flow rate predictions.

Optionally, the fitted measurements comprise the difference between, or a ratio between, actual wet and dry baseline values of a ratio of the recovered and traditional differential pressure measurements.

Optionally, the fitted measurements comprise the difference between, or a ratio between, actual wet and dry baseline values of a ratio of the recovered and PPL differential pressure measurements.

Optionally, the fitted measurements comprise the difference between, or a ratio between, the recovered and traditional flow rate predictions.

Optionally, the fitted measurements comprise the difference between, or a ratio between, actual wet and dry baseline values of a ratio of the PPL and traditional differential pressure measurements.

Optionally, the fitted measurements comprise two or more sets of the fitted measurements of the previous statements; so that multiple sets of fitted measurements providing multiple sub-systems that can be cross-referenced.

Optionally, a warning can be generated if the different wet gas flow parameter outputs do not agree to within given uncertainties.

According to a sixth aspect of the disclosure there is provided a differential pressure (DP) meter system comprising:

a fluid conduit comprising a fluid obstruction means and a plurality of pressure ports;

a first DP transmitter for measuring a permanent pressure loss (PPL) differential pressure taken between a position upstream of the fluid obstruction means and a position downstream of the fluid obstruction means;

a second DP transmitter for measuring a traditional differential pressure taken between the position upstream of the fluid obstruction means and an intermediate position between the upstream and downstream positions;

a third DP transmitter for measuring a recovered differential pressure taken between the intermediate position and the downstream position; and calculation means for fitting measurements comprising one or more of the measured differential pressures or data derived from one or more of the measured differential pressures to a liquid loading parameter, a pressure parameter and a gas flow rate parameter;

comparing a liquid loading parameter expression derived from said fitting to an over-reading correction factor expression;

and, by iteration of said combined expressions, determining the liquid loading parameter and determining a gas mass flow rate and/or a liquid mass flow rate.

The "calculation means" can also be termed as a "calculator" and may be a computer processor or equivalent.

Optionally, one or more of said liquid loading parameter, pressure parameter and gas flow rate parameters comprise dimensionless parameters.

Optionally, said liquid loading parameter comprises a Lockhart-Martinelli parameter.

Optionally, said pressure parameter comprises a gas to liquid density ratio.

Optionally, said gas flow rate parameter comprises a gas densiometric Froude number.

Optionally, said data derived from one or more of the measured differential pressures comprises a flow rate prediction calculated from one of the measured differential pressures.

Optionally, calculating a flow rate prediction from two of the measured differential pressures comprises calculating at least one from the group comprising: a permanent pressure loss (PPL) flow rate prediction derived from said PPL differential pressure; a traditional flow rate prediction derived from said traditional differential pressure; and a recovered flow rate prediction derived from said recovered differential pressure.

Optionally; said data derived from one or more of the measured differential pressures comprises ratios between any pair of the measured differential pressures.

Optionally, the determining of the gas mass flow rate, liquid mass flow rate and liquid loading comprises substituting a predicted liquid loading parameter expression into a wet gas correlation fitted for a flow rate prediction derived from any one of the traditional, recovered or PPL measurements to predict the gas flow rate, and iterating the resulting expression.

Optionally, the fitted measurements comprise the difference between, or a ratio between, the PPL and traditional flow rate predictions.

Optionally, the fitted measurements comprise the difference between, or a ratio between, the PPL and recovered flow rate predictions.

Optionally, the fitted measurements comprise the difference between, or a ratio between, actual wet and dry baseline values of a ratio of the recovered and traditional differential pressure measurements.

Optionally, the fitted measurements comprise the difference between, or a ratio between, actual wet and dry baseline values of a ratio of the recovered and PPL differential pressure measurements.

Optionally, the fitted measurements comprise the difference between, or a ratio between, actual wet and dry baseline values of a ratio of the PPL and traditional differential pressure measurements.

Optionally, the fitted measurements comprise the difference between, or a ratio between, the recovered and traditional flow rate predictions.

Optionally, the fitted measurements comprise the difference between, or a ratio between, actual wet and dry baseline values of a ratio of the PPL and traditional differential pressure measurements.

Optionally, the fitted measurements comprise two or more sets of the fitted measurements of the previous statements; so that multiple sets of fitted measurements providing multiple sub-systems that can be cross-referenced.

Optionally, the DP meter system comprises an alarm mechanism that generates an alarm or warning signal if the different wet gas flow parameter outputs do not agree to within given uncertainties.

According to a seventh aspect of the disclosure there is provided a computer program product comprising instructions that, when run on a flow computer, enable said flow computer to receive electronic signals representative of differential pressure measurements; fit measurements comprising one or more of the measured differential pressures or data derived from one or more of the measured differential pressures to a liquid loading parameter, a pressure parameter and a gas flow rate parameter; compare a liquid loading parameter expression derived from said fitting to an over-reading correction factor expression; and, by iteration of said combined expressions, determine the liquid loading parameter and determine a gas mass flow rate and/or a liquid mass flow rate.

Optionally, one or more of said liquid loading parameter, pressure parameter and gas flow rate parameters comprise dimensionless parameters.

Optionally, said liquid loading parameter comprises a Lockhart-Martinelli parameter.

Optionally, said pressure parameter comprises a gas to liquid density ratio.

Optionally, said gas flow rate parameter comprises a gas densiometric Froude number.

Optionally, deriving data from one or more of the measured differential pressures comprises calculating a flow rate prediction from one of the measured differential pressures.

Optionally, said differential pressure measurements are derived from the metering of flow through a fluid conduit comprising a fluid obstruction means and a plurality of pressure ports, and comprise:

a permanent pressure loss (PPL) differential pressure taken between a position upstream of the fluid obstruction means and a position downstream of the fluid obstruction means;

a traditional differential pressure taken between the position upstream of the fluid obstruction means and an intermediate position between the upstream and downstream positions; and a recovered differential pressure taken between the intermediate position and the downstream position.

Optionally, calculating a flow rate prediction from the measured differential pressures comprises calculating at least one from the group comprising: a permanent pressure loss (PPL) flow rate prediction derived from said PPL differential pressure; a traditional flow rate prediction derived from said traditional differential pressure; and a recovered flow rate prediction derived from said recovered differential pressure.

Optionally; said data derived from one or more of the measured differential pressures comprises ratios between any pair of the measured differential pressures.

Optionally, the determining of the gas mass flow rate, liquid mass flow rate and liquid loading comprises substituting a predicted liquid loading parameter expression into a wet gas correlation fitted for a flow rate prediction derived from any one of the traditional, recovered or PPL measurements to predict the gas flow rate, and iterating the resulting expression.

Optionally, the fitted measurements comprise the difference between, or a ratio between, the PPL and traditional flow rate predictions.

Optionally, the fitted measurements comprise the difference between, or a ratio between, the PPL and recovered flow rate predictions.

Optionally, the fitted measurements comprise the difference between, or a ratio between, actual wet and dry baseline values of a ratio of the recovered and traditional differential pressure measurements.

Optionally, the fitted measurements comprise the difference between, or a ratio between, actual wet and dry baseline values of a ratio of the recovered and PPL differential pressure measurements.

Optionally, the fitted measurements comprise the difference between, or a ratio between, the recovered and traditional flow rate predictions.

Optionally, the fitted measurements comprise the difference between, or a ratio between, actual wet and dry baseline values of a ratio of the PPL and traditional differential pressure measurements.

Optionally, the fitted measurements comprise two or more sets of the fitted measurements of the previous statements; so that multiple sets of fitted measurements providing multiple sub-systems that can be cross-referenced.

Optionally, a warning can be generated if the different wet gas flow parameter outputs do not agree to within given uncertainties.

According to an eighth aspect of the disclosure there is provided a flow computer arranged to receive electronic signals representative of differential pressure measurements; fit measurements comprising one or more of the measured differential pressures or data derived from one or more of the measured differential pressures to a liquid loading parameter, a pressure parameter and a gas flow rate parameter; compare a liquid loading parameter expression derived from said fitting to an over-reading correction factor expression; and, by iteration of said combined expressions, determine the liquid loading parameter and determine a gas mass flow rate and/or a liquid mass flow rate.

The flow computer of the eighth aspect may be arranged to carry out any of the steps that are enabled by the computer program product of the seventh aspect, or as are otherwise described herein.

According to a ninth aspect of the disclosure there is provided a differential pressure (DP) meter comprising:

a fluid conduit comprising a fluid obstruction means and a plurality of pressure ports;

a first DP transmitter for measuring a permanent pressure loss (PPL) differential pressure taken between a position upstream of the fluid obstruction means and a position downstream of the fluid obstruction means;

a second DP transmitter for measuring a traditional differential pressure taken between the position upstream of the fluid obstruction means and an intermediate position between the upstream and downstream positions;

a third DP transmitter for measuring a recovered differential pressure taken between the intermediate position and the downstream position; wherein each DP transmitter has a first pressure port and a second pressure port; and each DP transmitter port is coupled to only one fluid conduit pressure port to form a dedicated fluid channel.

The "positions" referred to are positions along a longitudinal axis of the fluid conduit.

A dedicated fluid channel is dedicated to a unique pair of DP transmitter and fluid conduit pressure ports; that is, the channel is not coupled to or directly influenced by any other pressure port.

Optionally, the DP meter comprises a plurality of tubing elements that provide a coupling between the pressure ports of each dedicated channel.

Optionally, said plurality of fluid conduit pressure ports comprise a pair of pressure ports provided at an upstream pressure plane; a pair at an intermediate pressure plane and a pair at a downstream pressure plane.

Optionally, each pair of fluid conduit pressure ports comprises pressure ports at different radial positions of a fluid conduit cross section.

Optionally, the DP meter comprises a network interface and/or data transmission components for sending pressure readings to a flow computer.

According to a tenth aspect of the disclosure there is provided a method of metering flow through a fluid conduit comprising a fluid obstruction means, comprising the steps of:

measuring a permanent pressure loss (PPL) differential pressure taken between a position upstream of the fluid obstruction means and a position downstream of the fluid obstruction means;

measuring a traditional differential pressure taken between the position upstream of the fluid obstruction means and an intermediate position between the upstream and downstream positions;

measuring a recovered differential pressure taken between the intermediate position and the downstream position; and wherein:

each differential pressure measurement is derived by comparing the pressures of a first dedicated fluid channel formed between a first pressure port of a DP transmitter and a first fluid conduit pressure port and a second dedicated fluid channel formed between a second pressure port of a DP transmitter and a second fluid conduit pressure port.

Optionally, the method comprises calculating a fluid flow rate on the basis of each of the measured differential pressures.

Optionally, the method comprises comparing the three calculated fluid flow rates and, if they are not equal to within a given uncertainty, identifying two fluid flow rates that are equal to each other and identifying the remaining fluid flow rate as being erroneous.

Optionally, the method comprises calculating a corrected flow rate for the erroneous flow rate, based on the other two measured flow rates (for example by averaging them).

Optionally, the method comprises determining a flow rate error by differencing the originally calculated flow rate and the corrected flow rate.

Optionally, the measurement of the differential pressures comprises, at a DP transmitter head, converting a pressure difference into an electronic signal.

Optionally, the method comprises sending electronic signals to a flow computer.

Optionally, the method comprises generating an alarm or warning signal if an erroneous flow rate is identified.

According to an eleventh aspect of the disclosure there is provided a computer program product comprising instructions that, when run on a flow computer, enable said flow computer to receive electronic signals representative of differential pressure measurements; to calculate a fluid flow rate on the basis of each of the measured differential pressures; and to compare the three calculated fluid flow rates and, if they are not equal to within a given uncertainty, identify two fluid flow rates that are equal to each other and identify the remaining fluid flow rate as being erroneous.

Optionally, the instructions, when run on a flow computer, enable said flow computer to calculate a corrected flow rate for the erroneous flow rate, based on the other two measured flow rates (for example by averaging them).

Optionally, the instructions, when run on a flow computer, enable said flow computer to determine a flow rate error by differencing the originally calculated flow rate and the corrected flow rate.

Optionally, said differential pressure measurements are derived from the metering of flow through a fluid conduit comprising a fluid obstruction means and a plurality of pressure ports, and comprise:

a permanent pressure loss (PPL) differential pressure taken between a position upstream of the fluid obstruction means and a position downstream of the fluid obstruction means;

a traditional differential pressure taken between the position upstream of the fluid obstruction means and an intermediate position between the upstream and downstream positions; and a recovered differential pressure taken between the intermediate position and the downstream position;

and wherein each differential pressure measurement is derived by comparing the pressure of a first dedicated fluid channel formed between a first pressure port of a DP transmitter and a first fluid conduit pressure port and a second dedicated fluid channel formed between a second pressure port of a DP transmitter and a second fluid conduit pressure port.

According to a twelfth aspect of the disclosure there is provided a flow computer adapted to receive electronic signals representative of differential pressure measurements; to calculate a fluid flow rate on the basis of each of the measured differential pressures; and to compare the three calculated fluid flow rates and, if they are not equal to within a given uncertainty, identify two fluid flow rates that are equal to each other and identify the remaining fluid flow rate as being erroneous.

The flow computer of the twelfth aspect may be arranged to carry out any of the steps that are enabled by the computer program product of the eleventh aspect, or as are otherwise described herein.

It will also be appreciated that the "dedicated fluid channel" arrangements described in the ninth to twelfth aspects may be used in conjunction with any of the first to eighth aspects described above.

The computer program products of the various aspects mentioned above may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. The instructions or code associated with a computer-readable medium of the computer program product may be executed by a computer, e.g., by one or more processors, such as one or more digital signal processors (DSPs), general purpose microprocessors, ASICs, FPGAs, or other equivalent integrated or discrete logic circuitry.

The disclosure will now be described, by way of example only, with reference to the accompanying drawings, in which.

Traditional DP meters employ one DP (termed herein the "traditional" DP) and one flow rate prediction (termed herein the "traditional" flow rate prediction). However, referring again to FIG. 1, with three DPs there are three flow rate prediction methods: the traditional meter (using $\Delta P_t$), the expansion meter (using $\Delta P_r$) and the permanent pressure loss (PPL) meter (using $\Delta P_{PPL}$).

Figure 1:
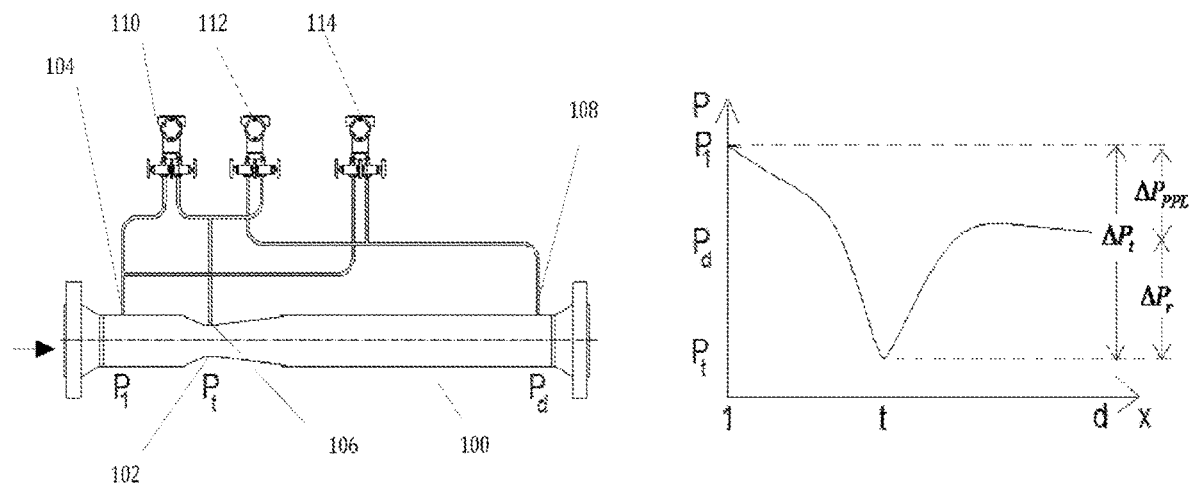
FIG. 1 shows a basic instrumentation sketch of a differential pressure (DP) meter with a corresponding pressure fluctuation sketch graph.

These are illustrated on the right hand side of FIG. 1, which shows a plot of pressure with the distance along the fluid conduit. The primary element (Venturi constriction in this example) cause the pressure to drop from its upstream value $P_1$, falling to a minimum, $P_t$, at the primary element (the throat of the Venturi constriction in this example), before partially recovering to a downstream value, $P_d$. The traditional DP is that which is measured between the initial downstream pressure and the minimum pressure at the primary element; the recovery DP is that which is measured between the minimum pressure at the primary element and the recovered downstream pressure; and the PPL DP is that which is measured between the initial upstream pressure and the recovered downstream pressure. It should also be noted that in practice there will be a loss in pressure which is induced by energy losses due primarily to friction between the fluid and the walls of the fluid conduit. This is the reason the traditional DP is only partially recovered.

With correct meter operation, as these three flow rate predictions are predicting the same flow through the same meter body they must equate within the three flow rate prediction uncertainties, i.e.:

$$m=f(\Delta P_t)=g(\Delta P_r)=h(\Delta P_{PPL})$$

where 'f' denotes the traditional flow rate equation, 'g' denotes the expansion flow rate equation and 'h' denotes the PPL flow rate equation, which are:

Traditional Flow Equation: $m_t=EA_tYC_d\sqrt{2\rho\Delta P_t}$,
uncertainty±x % (1)

Expansion Flow Equation: $m_r=EA_tK_r\sqrt{2\rho\Delta P_r}$,
uncertainty±y % (2)

PPL Flow Equation: $m_{ppl}=AK_{PPL}\sqrt{2\rho\Delta P_{PPL}}$,
uncertainty±z % (3)

Note $m_t$, $m_r$, and $m_{PPL}$ represent the traditional, expansion and PPL mass flow rate equation predictions of the actual mass flow rate (m) respectively. The symbol ρ represents the inlet fluid density. Symbols E, A and $A_t$ represent the geometric constants of the velocity of approach, the inlet cross sectional area and the minimum (or "throat") cross sectional area through the meter respectively. The parameter Y is an expansion factor accounting for gas density fluctuation through the meter. (For liquids Y=1.) The terms $C_d$, $K_r$ and $K_{PPL}$ represent the discharge coefficient, the expansion coefficient and the PPL coefficient respectively.

Three flow rate predictions means three flow rate prediction pairs to be compared and therefore yield three diagnostic checks.

The three DPs produce three DP ratios, i.e. $\Delta P_{PPL}/\Delta Pt$, called the Pressure Loss Ratio (PLR), $\Delta Pr/\Delta Pt$, called the Pressure Recovery Ratio (PRR), and $\Delta Pr/\Delta P_{PPL}$, called the recovery to permanent pressure loss ratio (RPR). The diagnostic system utilizes the fact that these three DP ratios are known constants for a generic DP meter at any given flow rate. Three diagnostic checks are created by checking each of the three measured DP ratios with the known correctly performing meter's DP ratios.

$$\Delta P_t=\Delta P_r\pm\Delta P_{PPL} \quad (4)$$

Finally, the diagnostic system notes that the sum of the recovered DP ($\Delta Pr$) and PPL ($\Delta P_{PPL}$) must equate to the traditional DP ($\Delta Pt$) value, see equation 1. If the three read DPs do not follow equation 4 (within the three DP reading uncertainties) then there is a diagnostic statement that one or more of the DP transmitters has malfunctioned.

Some DP transmitter diagnostics for the situations of a blocked or plugged impulse line and for wet gas flow involve analysis of the standard deviation of the differential pressure readings between the low pressure port and high pressure port of the transmitter head. These technologies are specific to a stand alone DP transmitter, that is, the DP measurement sub-system section of the overall DP meter system.

In both cases, the DP transmitter requires the installation of additional software inside the transmitter head, and in the case of the DP transmitter wet gas flow technology, the DP transmitter also requires a physical change of a significantly higher frequency signal reading—of about 20 Hz rather than the typical DP transmitter head operating frequency of 2 to 4 Hz. This requires the purchase of a specialist DP transmitter (as a standard commercially available DP transmitter will have an operating frequency of 4 Hz or less), together with suitable customised software to interpret the high frequency signals and additional computing resources to store and process the additional data from the higher frequency measurements. Neither technology uses any information obtained externally to the stand alone DP transmitter sub-system.

When it comes to predicting the gas and liquid flows of a wet gas flow through a DP meter, three methods can be used. Two of these methods apply a downstream pressure tap (see FIG. 1) and the third applies a very high frequency traditional DP reading. These will be discussed in turn.

The first method uses the traditional DP meter gas flow rate prediction with a PLR measurement. Wet gas causes the gas flow rate prediction to have a bias. Wet gas flow testing at test facilities can characterize this traditional DP meter flow rate prediction bias, and allows a wet gas flow correction factor to be data fitted. If the operator knows liquid flow information (e.g. the liquid flow rate or the liquid to gas flow rate ratio) the correction factor can be applied to predict the correct gas flow rate.

Reading the traditional & PPL DPs gives the PLR, with the traditional flow rate prediction producing a biased gas flow rate prediction. The PLR is a set value for a dry gas flow but is sensitive to the liquid to gas flow rate ratio (or equivalent liquid loading parameters). Hence, the PLR data can be fitted to the liquid to gas flow rate ratio (or equivalent liquid loading parameters). The liquid to gas flow rate ratio can therefore be derived from the PLR and then applied to the traditional DP meter's wet gas flow rate correction factor to find the gas flow rate. This in effect cross-references the wet gas flow response of the traditional DP meter and the PLR.

A second method uses the traditional and recovered DPs, which can be read and applied to the traditional & expansion DP meter gas flow rate predictions. The wet gas flow causes both the traditional and expansion meter gas flow rate predictions to have biases, which are different to each other. Wet gas flow testing at test facilities can characterize both the traditional & expansion DP meter flow rate prediction biases, and allows a wet gas flow correction factor for each metering method to be data fitted. The traditional & expansion DP meter wet gas correction factors can then be cross referenced (i.e. the two equations are solved simultaneously) to predict the gas & liquid flow rates (i.e. to predict the two unknowns).

A third method uses a traditional DP Meter with a fast response DP transmitter. Single phase flow through a DP meter at set flow conditions produces a repeatable and reproducible traditional DP signal. However, due to natural small flow and DP fluctuations, the DP used in the flow metering calculations is an average value, with a small but finite 'standard deviation'. These DP fluctuations are natural and normal for all instrumentation. Wet gas flow enhances the standard deviation of a DP meters traditional DP signal, and if a very high frequency DP transmitter was used, the resulting DP signal can be analysed to give wet gas flow condition information.

It is useful at this point to consider certain wet gas flow meter terminology. The following wet gas flow parameters are commonly used in industry and are listed in the American Society of Mechanical Engineering Report 19G, on wet gas metering.

The Lockhart-Martinelli parameter ($X_{LM}$) is a parameter used to quantify the 'wetness' of the gas flow. It expresses the liquid to gas mass flow ratio for a set gas to liquid density ratio. It is calculated by equation 5.

$$X_{LM} = \frac{m_l}{m_g}\sqrt{\frac{\rho_g}{\rho_l}} \quad (5)$$

Note $m_g$ and $m_l$, are the gas and liquid mass flow rates and $\rho_g$ and $\rho_l$ are the gas and liquid densities respectively.

The gas to liquid density ratio (DR) is a dimensionless representation of the pressure (for set fluid components and thermodynamic conditions). It is calculated by equation 6:

$$DR = \rho_g/\rho_l \quad (6)$$

The gas densiometric Froude number ($Fr_g$) is a dimensionless representation of the gas flow rate (for set gas & liquid components, set pipe size and thermodynamic conditions). It is calculated by equation 7.

$$Fr_g = \frac{m_g}{A\sqrt{gD}}\sqrt{\frac{1}{\rho_g(\rho_l - \rho_g)}} \quad (7)$$

Note that 'g' represents the gravitational constant (9.81 m/s$^2$), 'D' is the pipe internal diameter and 'A' is the meter inlet area.

Finally, wet gas flows tend to induce upon DP meters a positive bias (or 'over-reading') on their gas flow rate prediction. The uncorrected gas mass flow rate prediction is often called the 'apparent' gas mass flow ($m_{g,apparent}$) The over-reading, OR, is the ratio of the apparent to actual gas flow rate.

Equations 8 & 8a show the over-reading and percentage over-reading, % OR, where $\Delta P_{tp}$ is the actual 'two-phase' or 'wet gas' traditional differential pressure and $\Delta P_g$ is the differential pressure if the gas phase flowed without the liquid respectively.

$$OR = \frac{m_{g,apparent}}{m_g} \cong \sqrt{\frac{\Delta P_{tp}}{\Delta P_g}} \quad (8)$$

$$OR(\%) = \left(\frac{m_{g,apparent}}{m_g} - 1\right)*100\% \cong \left(\sqrt{\frac{\Delta P_{tp}}{\Delta P_g}} - 1\right)*100\% \quad (8a)$$

As mentioned above, wet natural gas flow causes DP meter problems. A first is that the liquid induces a bias on the DP meters gas flow rate prediction. A second is that water based wet natural gas flows can block a pressure port/impulse line with hydrate, salt or scale deposits.

A blocked pressure port causes the DP measurement to be erroneous. Unfortunately the DP reading integrity check of the existing diagnostic system (i.e. equation 4) can only see DP transmitter malfunctions (such as over-ranged, incorrectly calibrated or drifting DP transmitters). This diagnostic technique cannot see a blocked pressure port. This is because a blocked pressure port induces a problem to two of the three DP transmitters, and these two DP transmitter's DP errors always cancel out in equation 4a.

$$\Delta P_t = \Delta P_r + \Delta P_{PPL} \quad (4)$$

$$\Delta P_t^* = \Delta P_t - \Delta P_{error} = \Delta P_r + \Delta P_{PPL}^* = \Delta P_r + (\Delta P_{PPL} - \Delta P_{error}) \quad (4a)$$

For example, consider the scenario of the upstream pressure port being blocked. Say at a point in time this blocked upstream port has a pressure lower than the actual pressure at the port. The traditional DP ($\Delta P_t$) is read too low ($\Delta P_t^*$) by a DP error ($\Delta P_{error}$). The PPL DP ($\Delta P_{PPL}$) is read too low ($\Delta P_{PPL}$) by the same DP error ($\Delta P_{error}$). The diagnostic check is equation 4, but with this scenario the DP errors cancel out as seen in equation 4a. Therefore, the current diagnostic system cannot see a blocked port/impulse line.

However, the inventor has developed the existing single phase DP meter diagnostic system for wet gas flow diagnostics to identify blocked port/impulse lines, to identify wet from dry gas flows, to be able to tell the difference between a blocked port/impulse line and wet gas flow, and to improve the methods used to predict the wet gas flows gas and liquid flow rates.

Figure 2:
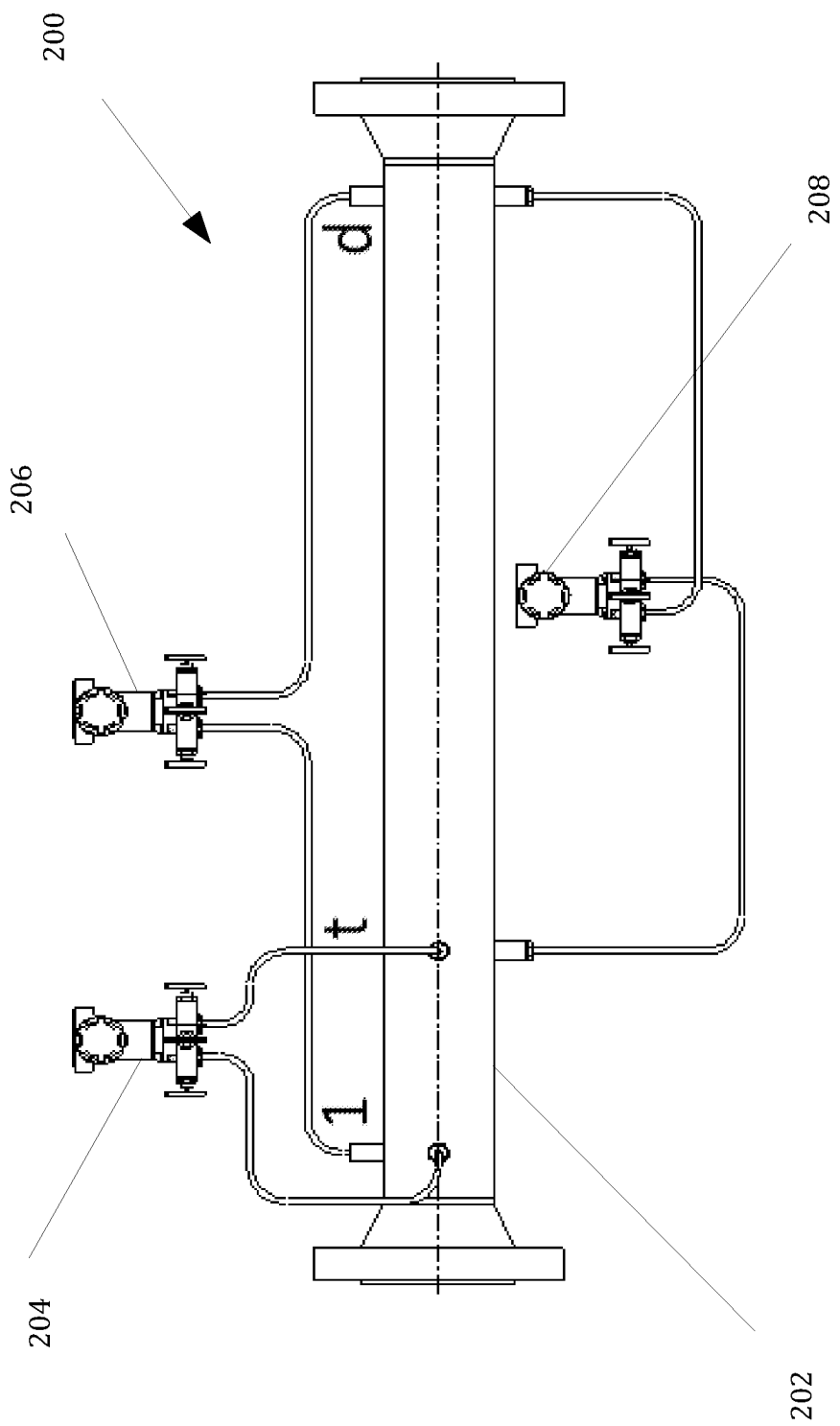
FIG. 2 shows a DP meter with two pressure ports at each pressure reading plane.

The current DP meter diagnostic system can be made to see a blocked port/impulse line if the three DP readings are taken from independent pressure ports/impulse lines (see FIG. 2). This requires that a DP meter have at least two pressure ports in each plane of measurement. So, for a DP meter system measuring pressure at three points along a fluid conduit, there must be at least six pressure ports comprising at least two at the upstream plane, two at the midstream plane, and two at the downstream plane.

An example of this layout is shown in FIG. 2. Here a Venturi meter is used as an example but the principle holds for any generic DP meter. The meter 200 comprises three DP transmitters 204, 206, 208. In contrast to the arrangement of FIG. 1, the fluid conduit 202 is provided with two pressure ports in each plane of pressure measurement, and each impulse line provides a dedicated fluid channel between one DP transmitter pressure port and one fluid conduit pressure port.

With this configuration, if one of the pressure ports or impulse lines is blocked, because that pressure port or impulse line is not shared between two DP transmitters, then the other two DP readings are still correct. Hence, equation 4 now sees the problem.

For example, let us again consider the scenario of a blocked upstream pressure port or impulse line. There are now two fluid conduit ports provided at the upstream plane, so let's assume it is the port that is used to read the traditional DP that is blocked and say it outputs an artificially low pressure reading. The traditional DP ($\Delta P_t$) is read incorrectly at ($\Delta P_t^*$) because of the error ($\Delta P_{error}$) However the recovered DP ($\Delta P_r$) and PPL DP ($\Delta P_{PPL}$) are read correctly. Hence, we get an inequality as shown in equation 4b, and the system identifies the DP error. In the same way this meter's DP reading diagnostic check can see problems with any of the other impulse lines. This holds true for single phase flow or wet gas flow.

$$\Delta P_t^* = \Delta P_t - \Delta P_{error} \neq \Delta P_r + \Delta P_{PPL} \quad (4b)$$

If the flow is identified as single phase flow (as discussed below), it is then possible to identify which DP is erroneous, as well as the associated DP and flow rate error. When equation 4b shows a DP problem, then each DP can be used to calculate the flow rate via its flow equation. The two DP's that are correct produce the same flow rate prediction (within their respective uncertainties). The erroneous DP will produce a flow rate prediction that disagrees with the other two flow rate predictions. With the erroneous DP reading identified it can be discarded and replaced by the inferred value from equation 4. Once the true DP (and hence true flow rate) is known, the error in DP measurement and therefore error in flow rate prediction from that erroneous DP measurement is also known.

Figures 3, 4:
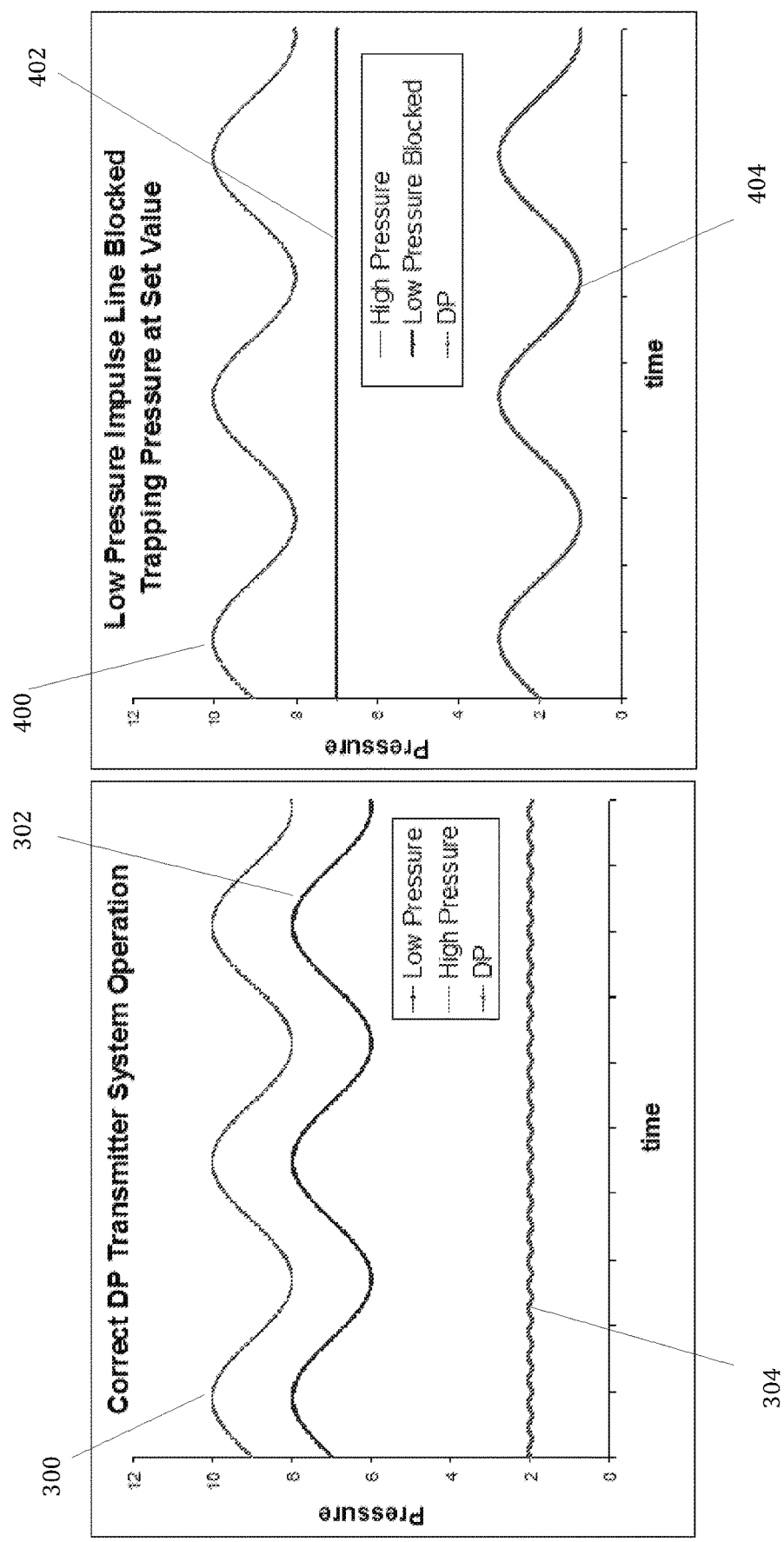
FIG. 3 shows a standard DP reading for a steady single phase flow.
FIG. 4 shows a DP reading with a blocked pressure port.

With 'steady' single phase flow, the line pressure actually varies very slightly around an average value. The line pressure is typically an order (or two) larger than the DP (or DPs) produced by a DP meter. Therefore, the pressure at each DP meter pressure port rises and falls significantly compared the DP being measured. With normal operation this does not matter as both pressure ports of each DP transmitter have the same naturally synchronized rising and falling line pressure. FIG. 3 (simplified and exaggerated for clarity) shows a representation of this phenomenon. The high and low pressure values 300, 302 at the two ports fluctuate in synchronization with the line pressure, and hence a relatively steady DP 304 with a low standard deviation is read.

FIG. 4 shows the effect of one pressure port becoming blocked, sealing the fluid in the impulse line at a steady settled pressure representative of the time it was sealed. The high pressure values 400 fluctuate as before, but because the low port is blocked (in this example), the low pressure 402 is steady and the resulting DP reading 404 has a standard deviation that is an order of magnitude higher than that of FIG. 3 where no ports or impulse lines are blocked, seeing as the two pressure ports' pressure variations are no longer cancelling each other out.

A standalone DP transmitter may have a basic diagnostic system based on a comparison of actual DP standard deviations with historically correct baseline data, in order to monitor if the DP transmitter's impulse lines are clear; and when an impulse line gets blocked to state which one is blocked. When a significant jump in DP standard deviation is noted special software in the DP transmitter head can examine the two individual pressure readings looking for a relatively stable pressure (signifying a blocked impulse line) or a relatively unstable pressure (signifying a clear impulse line). However, when a fluid conduit pressure port is blocked these internal diagnostics do not tell the operator the correct DP.

FIGS. 5-7 illustrate the operation of a diagnostic system that can be employed with a DP flow meter of the type illustrated in FIG. 1, namely where a fluid conduit comprises downstream, mid-stream and upstream pressure ports each of which are coupled with the pressure ports of two different DP transmitters.

Figure 5B:
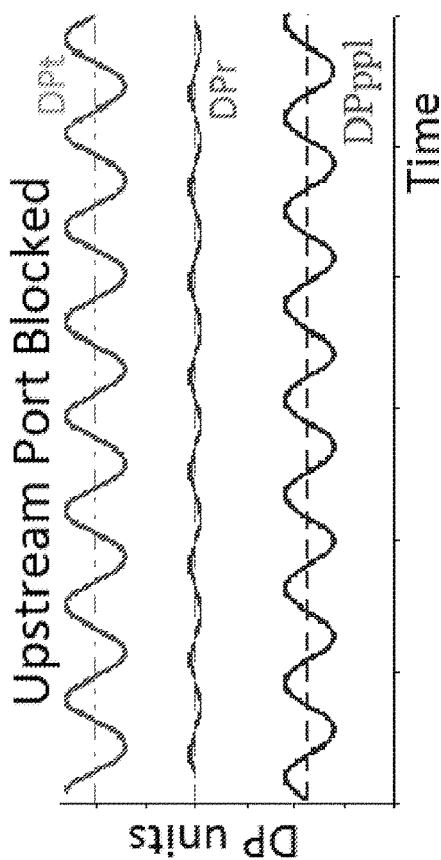
FIG. 5 shows a comparison of a serviceable DP meter DP fluctuation to a DP meter with a blocked up-stream pressure port or impulse line.
Figure 5A:
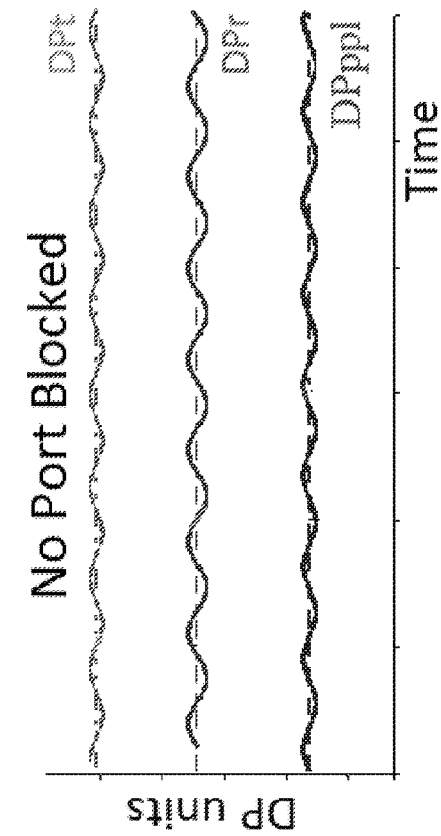

FIG. 5 shows a comparison between the 3 DP (see FIG. 1) fluctuations if the DP meter system is fully serviceable (FIG. 5a), and the 3 DP fluctuations if the DP meter system has a blocked upstream pressure port or impulse line (FIG. 5b). The two DP readings that use that communal port both have a significantly higher DP standard deviation. This is due to the phenomenon shown for an individual DP transmitter in FIGS. 3 and 4. The DP reading that does not use the upstream pressure is unaffected. Therefore, from the significant rise in standard deviation of both the traditional and PPL DPs, and from the recovered DP's continuing relatively small standard deviation, the fact that the upstream pressure port or impulse line is blocked is clearly identifiable.

Figure 6B:
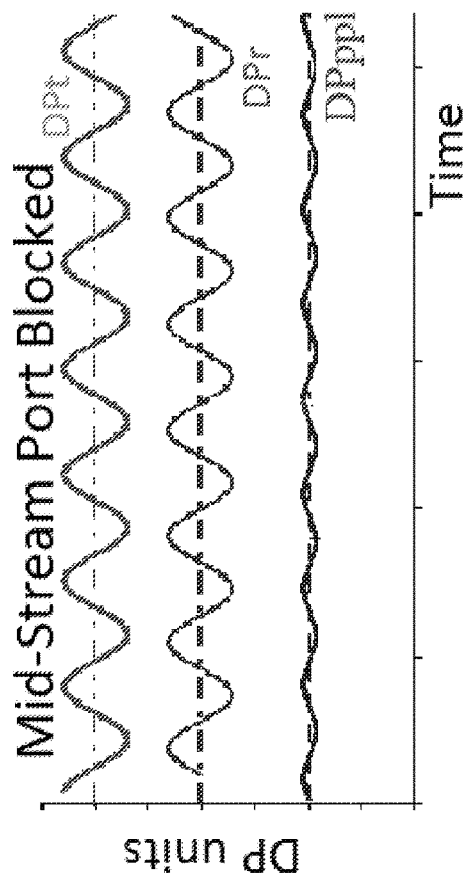
FIG. 6 shows a comparison of a serviceable DP meter DP fluctuation to a DP meter with a blocked mid-stream pressure port or impulse line.
Figure 6A:
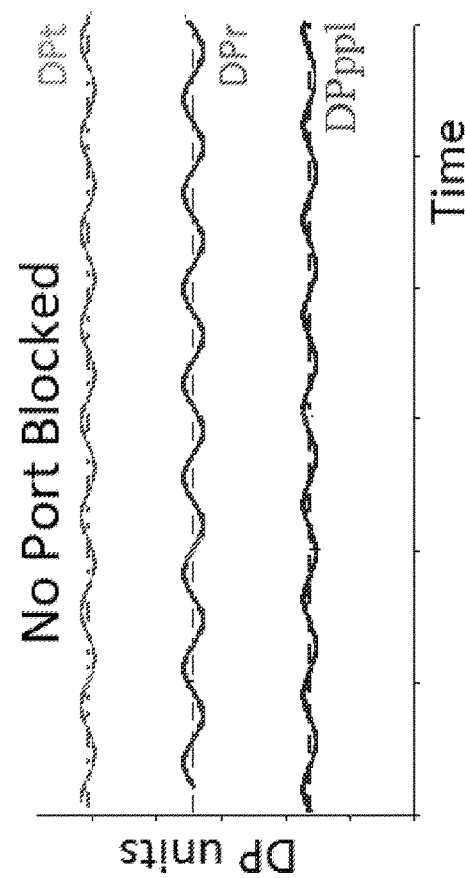

FIG. 6 shows a comparison between the 3 DP (see FIG. 1) fluctuations if the DP meter system is fully serviceable (FIG. 6a), and the 3 DP fluctuations if the DP meter system has a blocked mid-stream pressure port or impulse line (FIG. 6b). The two DP readings that use that communal port both have a significantly higher DP standard deviation. The DP reading that does not use the mid-stream pressure is unaffected. Therefore, from the significant rise in standard deviation of both the traditional and recovered DPs, and from the PPL DP's continuing relatively small standard deviation, the fact that the mid-stream pressure port or impulse line is blocked is clearly identifiable.

Figure 7B:
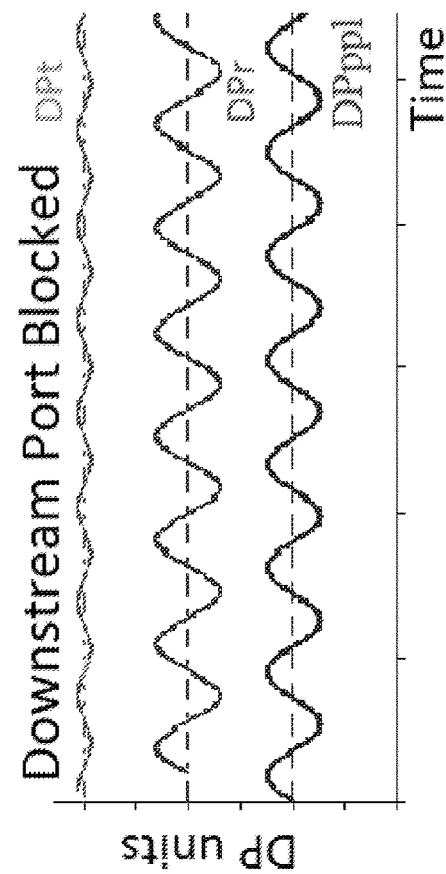
FIG. 7 shows a comparison of a serviceable DP meter DP fluctuation to a DP meter with a blocked down-stream pressure port or impulse line.
Figure 7A:
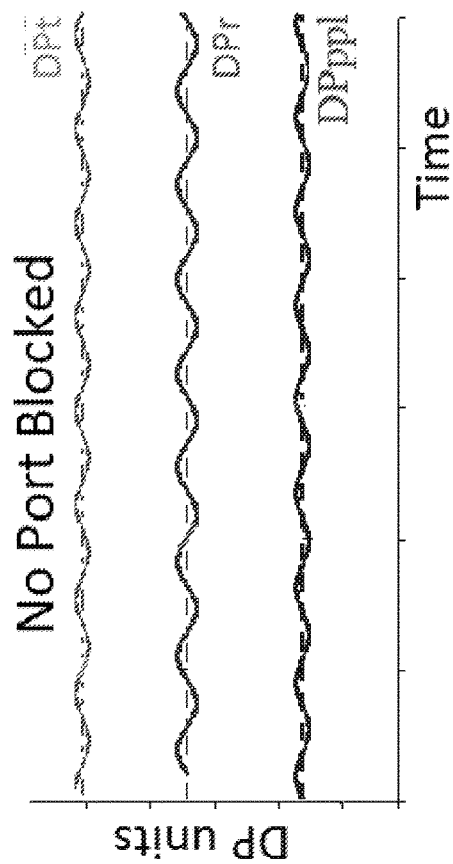

FIG. 7 shows a comparison between the 3 DP (see FIG. 1) fluctuations if the DP meter system is fully serviceable (FIG. 7a), and the 3 DP fluctuations if the DP meter system has a blocked downstream-stream pressure port or impulse line (FIG. 7b). The two DP readings that use that communal port both have a significantly higher DP standard deviation. The DP reading that does not use the downstream pressure is unaffected. Therefore, from the significant rise in standard deviation of both the recovered and PPL DPs, and from the traditional DP's continuing relatively small standard deviation, the fact that the downstream pressure port or impulse line is blocked is clearly identifiable.

Techniques similar to those illustrated in FIGS. 5-7 may also be employed to achieve a diagnostic system that can be employed with a DP flow meter of the type illustrated in FIG. 2, namely where a fluid conduit comprises at least two pressure ports at downstream, mid-stream and upstream pressure planes and each impulse line provides a dedicated fluid channel between one DP transmitter pressure port and one fluid conduit pressure port. In this case, a blocked pressure port or impulse line would produce a different 3 DP standard deviations 'pattern'. Only the DP with the blocked line would have an increased standard deviation. The other two DPs' standard deviations would remain relatively low.

So, comparison of the 3 DPs' standard deviations leads to a diagnostic capability which shows that a blocked pressure port or impulse line exists, and that also shows which pressure port or impulse line has the blockage.

Furthermore, once the blockage is identified the DP that does not use this pressure port is positively known to be trustworthy. This means that that DP can be used in its appropriate flow rate equation to find the true flow rate. Once the true flow rate is known, the true DPs of the two erroneous DPs can be back calculated from their appropriate flow rate equations. The two DP errors and the pressure blocked in the port can therefore be found. This diagnostic method is advantageous with respect to the basic diagnostics for a standalone DP transmitters blocked port because:

No special software is needed inside the DP transmitter's head to identify that a blocked port or impulse line exists.
No special software is needed inside a DP transmitter's head to identify which port or impulse line is blocked.
Standard off the shelf DP transmitters can be used (with no special software required) and the blocked port or impulse line diagnostic check may be carried out by a flow computer provided as part of the metering system or connectable to it. The computer can be at a site that is remote from the meter's location. A communication to the remote computer can be achieved by an internet or intranet connection.
The method disclosed here allows not only the particular blocked port or impulse line to be identified with no special DP transmitter capability, but in addition, for the true DPs to be identified, the error in the two erroneous DPs to be identified, and the true flow rate to be predicted.

So, the method described thusfar can identify blocked impulse lines. It is now desirable to identify wet gas flow and to distinguish between wet gas flow and blocked impulse lines.

As described above, it is possible for the existing DP meter diagnostic system to indicate a warning when there is wet gas flow instead of expected single phase flow, based on comparison of the traditional, recovered and permanent pressure loss DPs. However this warning arises from a diagnostic result that can be created from several different problems and is not specific to wet gas flow. The existing diagnostic system cannot specifically say a diagnostic warning is due to wet gas flow.

However, according to the present disclosure, a positive determination of wet gas flow can be made based upon a comparison of a signal variation parameter of the three DPs. The signal variation parameter may be a standard deviation although other parameters or statistical methods could be used.

Figure 8:
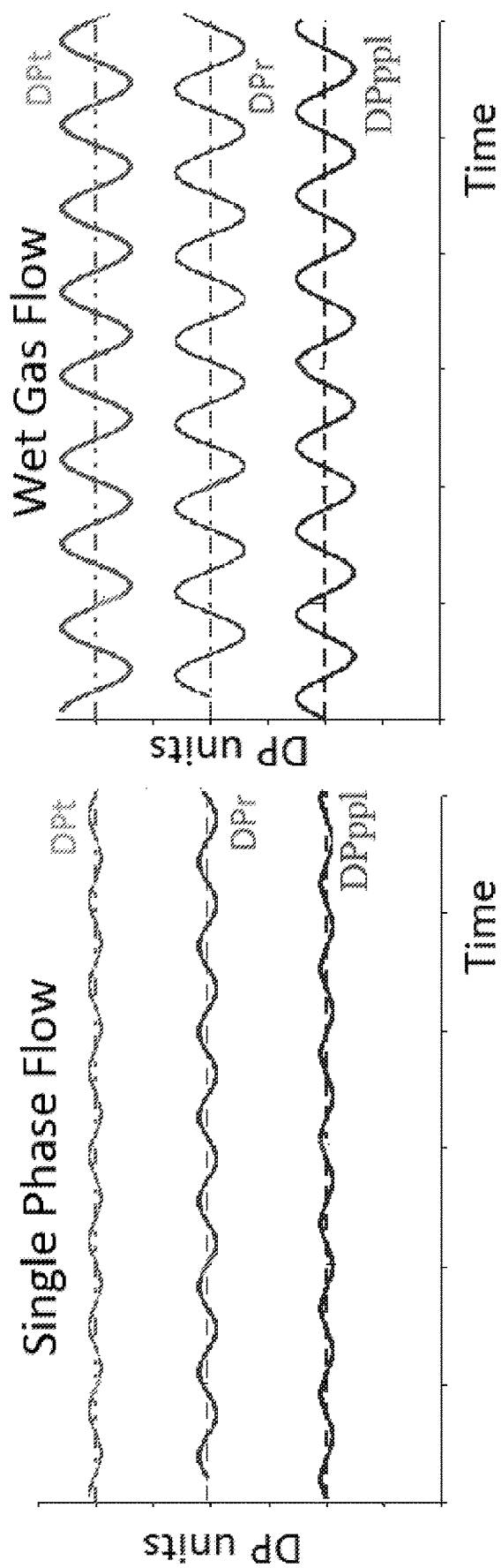
FIG. 8 shows a comparison of DP meter DP fluctuations between dry and wet gas flow.

Wet gas flow causes all three DP readings to become less stable, e.g. have a significant increase in standard deviation. A DP meter that measures three DPs, of the type illustrated in FIG. 1 or the type illustrated in FIG. 2, can compare the stability of the recorded three DP reading, e.g. compare the standard deviations, to historical baseline data for when the flow was dry gas. FIG. 8 shows a comparison between the 3 DP fluctuations if the flow is dry and the 3 DP fluctuations if the flow is a wet gas flow, for the example meters shown in FIGS. 1 & 2.

Notice that in FIGS. 5-7 a blocked pressure port or impulse line always creates two DPs with a relatively high standard deviation and one DP with a relatively low standard deviation. Therefore, if all three of the standard deviations are relatively large compared to a dry gas baseline, then the result is distinct from that of a blocked pressure port or impulse line, and so a positive determination of wet gas flow can be made.

Blocked impulse lines and wet gas flow can both cause DP readings to have a high standard deviation. However, due to the different nature of the physical phenomena causing the high DP standard deviation these two DP meter problems will usually have a different frequency of fluctuating DP. Wet gas flow causes the DP to vary relatively quickly, while natural pressure variations in a flow, and hence blocked impulse line read DPs, vary relatively slowly. Hence, it could be expected that the wet gas flow DP fluctuation frequency is usually significantly higher than the blocked impulse line frequency.

Note that this technology does not rely on assuming wet gas flow from the outset, and does not rely on using a special high frequency DP transmitter to analyse the wet gas flow conditions through a fully serviceable DP meter (which by definition has no blocked pressure port or impulse line). Instead, three DP transmitters are used to identify wet gas flow through a standard single phase DP meter, while also distinguishing wet gas flow from a blocked pressure port or impulse line.

This has been demonstrated for a six inch (15.24 cm), 0.7 beta ratio Venturi meter under dry and wet gas flow testing. For a line pressure of 35 Bar (35 kPa) and a gas flow rate of 4.33 kg/s, Table 1 shows the traditional, recovered and PPL average values with the associated standard deviations for both dry gas (i.e. a Lockhart-Martinelli parameter of zero) and for wet gas, in this case a Lockhart-Martinelli parameter of 0.099 (which is in this case a liquid flow of 2.34 kg/s with the gas flow of 4.33 kg/s).

TABLE 1

| Lockhart-Martinelli Parameter | 0 (Dry) | 0.099 (Wet) |
| --- | --- | --- |
| Traditional DPt (kPa) | 4.752 | 7.086 |
| Standard Deviation of DPt (%) | 0.142 | 1.062 |
| Recovery DPr (kPa) | 4.405 | 3.912 |
| Standard Deviation of DPr (%) | 0.154 | 3.158 |
| PPL DPppl (kPa) | 0.353 | 3.189 |
| Standard Deviation of DPppl (%) | 0.951 | 2.448 |

The liquid's presence causes the DP standard deviations of all three DPs to increase. This is a real world example of how the standard deviation of the three DP's can identify wet gas flow.

The present disclosure also teaches new systems and methods for metering wet gas flow, together with diagnostics.

A diagnostic system is described above that measures $\Delta Pr$, $\Delta P_{PPL}$ and $\Delta Pt$, and their ratios; the PLR, PRR and RPR.

These readings produce the following diagnostic parameters:

1. Comparing the PPL to traditional flow rate prediction. Taking the percentage difference and dividing by the maximum allowable difference, gives diagnostic parameter '$x_1$'.
2. Comparing the expansion to traditional flow rate prediction. Taking the percentage difference and dividing by the maximum allowable difference, gives diagnostic parameter '$x_2$'.
3. Comparing the expansion to PPL flow rate prediction. Taking the percentage difference and dividing by the maximum allowable difference, gives diagnostic parameter '$x_3$'.
4. Comparing the read to referenced PLR. Taking the percentage difference and dividing by the maximum allowable difference, gives diagnostic parameter '$y_1$'.
5. Comparing the read to referenced PRR. Taking the percentage difference and dividing by the maximum allowable difference, gives diagnostic parameter '$y_2$'.
6. Comparing the read to referenced RPR. Taking the percentage difference and dividing by the maximum allowable difference, gives diagnostic parameter '$y_3$'.
7. Comparing the read to inferred (i.e. summed recovered & PPL) traditional DPs. Taking the percentage difference and dividing by the maximum allowable difference, gives diagnostic parameter '$x_4$'.

Currently, a DP meter can either use diagnostic parameter $x_2$ or diagnostic parameter $y_1$ to meter wet gas flow, i.e. predict the gas and liquid flow rates. Currently, for either of these methods to be utilised to meter wet gas flow the operator must assume from the outset that wet gas flow is the only issue facing the meter and all DP readings are correct and caused by wet gas flow. Presently, such wet gas meters have no diagnostics, and no defense against the assumption of wet gas flow and correct DP readings being false. Existing technologies suffering other DP meter problems, e.g. a false DP reading due to a DP transmitter malfunction, falsely assume the problem to be due to wet gas flow and give erroneous gas and liquid outputs. Until this disclosure, no diagnostic method has been developed to identify wet gas flow as the particular issue causing the DP meter a problem, thereby removing the present necessity to assume wet gas flow, and then used to meter the identified wet gas flow.

The addition of a diagnostic system to such wet gas meters that can positively identify wet gas flow from other metering issues, rather than assuming wet gas flow, has never been done. Furthermore, four of the diagnostic parameters can be used as part of a wet gas meter system, but until now this has not been known.

In particular, the first, third, fifth, sixth diagnostic parameters in the above list have not previously been used to meter any wet gas through a DP meter. They are not just suitable for wet gas DP meter service, but also advantageous. If wet gas flow is assumed from the outset, or wet gas is diagnosed as the particular problem, then these four previously unused wet gas flow analysis techniques/diagnostic methods can predict gas and liquid flow rates independently of other methods. This can therefore offer more accurate wet gas flow measurement, additional system redundancy and even wet gas DP meter diagnostics.

The first and third diagnostic parameters on the above list both use the PPL flow rate prediction method. This PPL meter's reaction to wet gas is not documented by any literature. However, a DP meter's PPL flow rate equation can be sensitive to wet gas flow and therefore very useful (the scale of this sensitivity is DP meter type dependent). It is disclosed here that the traditional to PPL flow prediction comparison and the PPL to expansion flow rate comparison hold valuable wet gas flow information, in addition to the comparison of the traditional and expansion flow predictions.

The fifth & sixth diagnostic parameters on the above list both use the recovery DP in DP ratios, i.e. PRR & RPR. The reaction of the PRR & RPR to wet gas is not documented by any literature. However, both the PRR & RPR DP ratios are sensitive to wet gas flow and therefore very useful (the scale of this sensitivity is DP meter type dependent). It is disclosed here that the PRR & RPR hold valuable wet gas flow information, in addition to the PLR.

Figure 9:
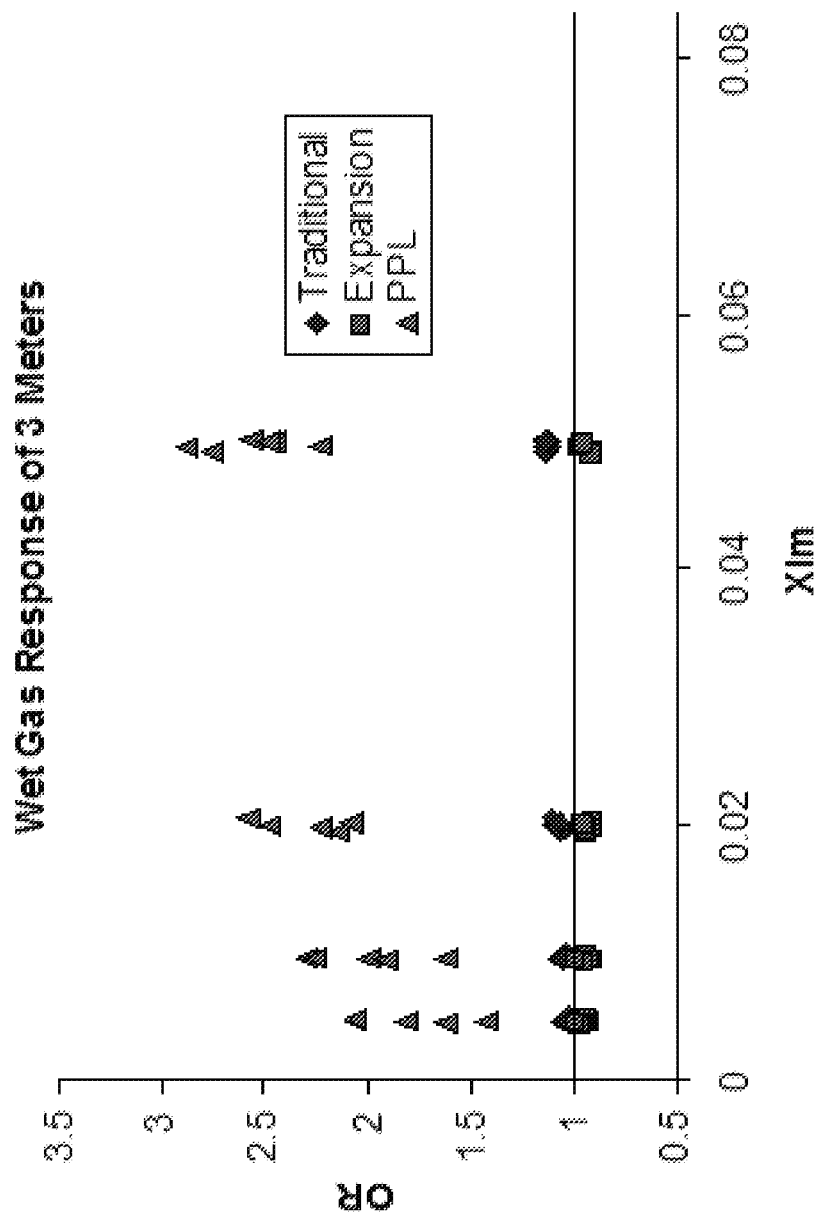
FIG. 9 shows wet gas over-readings for a six inch (15.24 cm), 0.7 beta ratio Venturi meter.

A six inch (15.24 cm), 0.7 beta ratio Venturi meter was tested under dry and wet gas flow. The three DP's were read. For all tests it was shown that equation 4 held true, as required. FIG. 9 shows the traditional, expansion & PPL meter flow rate prediction wet gas flow biases (or "over-readings", OR) vs. $X_{LM}$. Note that OR is defined by equation 9. For each meter the OR is the ratio of that particular flow meter's apparent gas mass flow rate prediction to the actual gas mass flow rate. The data set in FIG. 9 contains two set DR values & six set $Fr_g$ sub sets (not shown in the Figures to maintain clarity). These sub-sets account for most of the 'perceived' data scatter seen in FIG. 9. Each of the three gas mass flow rate prediction methods can have their gas flow rate prediction bias, i.e. their particular 'over-reading' (denoted by $OR_{trad}$, $OR_{expan}$, $OR_{PPL}$), fitted to a liquid loading parameter (e.g. the Lockhart Martinelli parameter, $X_{LM}$), a pressure parameter (e.g. gas to liquid density ratio, DR) & a gas flow rate parameter (e.g. gas densiometric Froude number, $Fr_g$) as shown in equations 9a, 9b & 9c respectively. Note $f_1$, $f_2$ & $f_3$ denote particular data fit functions.

$$OR_{trad} = \qquad (9a)$$
$$f_1(X_{LM}, DR, FR_g) = f_1\left(\frac{m_l}{m_g}\sqrt{\frac{\rho_g}{\rho_l}}, \frac{\rho_g}{\rho_l}, \frac{m_g}{A\sqrt{gD}}\sqrt{\frac{1}{\rho_g(\rho_l - \rho_g)}}\right)$$

$$OR_{expan} = \qquad (9b)$$
$$f_2(X_{LM}, DR, FR_g) = f_2\left(\frac{m_l}{m_g}\sqrt{\frac{\rho_g}{\rho_l}}, \frac{\rho_g}{\rho_l}, \frac{m_g}{A\sqrt{gD}}\sqrt{\frac{1}{\rho_g(\rho_l - \rho_g)}}\right)$$

$$OR_{PPL} = \qquad (9c)$$
$$f_3(X_{LM}, DR, FR_g) = f_3\left(\frac{m_l}{m_g}\sqrt{\frac{\rho_g}{\rho_l}}, \frac{\rho_g}{\rho_l}, \frac{m_g}{A\sqrt{gD}}\sqrt{\frac{1}{\rho_g(\rho_l - \rho_g)}}\right)$$

In FIG. 9 the over-reading of the traditional, expansion & PPL meters are such that the 'PPL meter' is significantly more sensitive to wet gas flow than the other two meters. The over-reading of the traditional flow meter is more sensitive to wet gas flow than the 'expansion meter'. In fact, in this case the 'expansion meter' has a negative gas flow rate prediction bias (i.e. a negative over-reading) induced by the wetness of the gas.

This particular result from this example is not a universal result for all DP meters. However, in all cases, the three flow rate predictions' respective 'apparent gas flow rates' will be different to each other, and the gradients of these 'over-readings' to Lockhart-Martinelli parameter will be different. The fact that these differences exist, for any DP meter, provides the basis for wet gas flow metering methods for any generic DP meter.

An operator of a DP meter with a downstream pressure tap may predict the gas and liquid flow rates of a wet gas flow by comparing the traditional and expansion meter flow rate predictions; traditional and PPL meter flow rate predictions; or the expansion and PPL meter flow rate predictions to a liquid loading parameter (e.g. Lockhart Martinelli parameter). The operator is not restricted to comparing a single pair of flow rate predictions to liquid loading, but can compare all three flow rate prediction pairs individually to the liquid loading to produce three methods of predicting the gas & liquid flow rates.

This is also true of the DP ratios. All three DP ratios are sensitive to wet gas flow, i.e. the DP ratios are sensitive to a liquid loading parameter (e.g. Lockhart-Martinelli parameter). An operator of a DP meter with a downstream pressure tap may predict the gas and liquid flow rates by comparing the read and baseline PLR; the read and baseline PRR; or the read and baseline RPR to a liquid loading parameter. The operator is not restricted to a single comparison of only one DP ratio to liquid loading to predict the gas & liquid flow rates, but can compare all three DP ratios individually to the liquid loading to produce three methods of predict the gas & liquid flow rates.

For any given DP meter geometry, each of the three flow rate prediction ratios & each of the three DP ratios can be related to a liquid loading parameter (e.g. the Lockhart-Martinelli parameter), a pressure parameter (e.g. gas to liquid density ratio), and a gas flow rate parameter (e.g. gas densiometric Froude number), and made into a wet gas meter method in their own right.

Method 1:

The ratio of the PPL to traditional flow rate prediction (or reciprocal), denoted here as $\phi_1$, can be related to the $X_{LM}$, DR and the $Fr_g$ (see equation 10, where '$f_a$' is a data fitted function). Therefore, $X_{LM}$ can be predicted by re-arranging function '$f_a$' to '$f_a^*$', as shown as equation 10a. This term relates $X_{LM}$ to known parameters and a single unknown parameter, i.e. the gas mass flow rate. This expression can be combined with the traditional, expansion or PPL flow meter wet gas meter corrections (i.e. equation 9a, 9b or 9c respectively) to produce one equation with one unknown, the gas mass flow rate. Iterating this equation gives both gas mass flow rate & $X_{LM}$ predictions. Using these values and known gas & liquid densities in equation 5 predicts the liquid mass low rate.

$$\phi_1(m_{g,apparent})_{PPL}/(m_{g,apparent})_{trad} = f_a(X_{LM}, DR, Fr_g) \quad (10)$$

$$X_{LM} = f_a^*(\phi_1, DR, Fr_g) = f_a^*\left(\phi_1, \frac{\rho_g}{\rho_l}, \frac{m_g}{A\sqrt{gD}}\sqrt{\frac{1}{\rho_g(\rho_l-\rho_g)}}\right) \quad (10a)$$

Method 2:

The ratio of the PPL to expansion flow rate prediction (or reciprocal), denoted here as $\phi_2$, can be related to the $X_{LM}$, DR and the $Fr_g$ (see equation 11, where V is a data fitted function). Therefore, $X_{LM}$ can be predicted by re-arranging function '$f_b$' to '$f_b^*$', as shown as equation 11a. This term relates $X_{LM}$ to known parameters and a single unknown parameter, i.e. the gas mass flow rate. This expression can be combined with the traditional, expansion or PPL flow meter wet gas meter corrections (i.e. equation 9a, 9b or 9c respectively) to produce one equation with one unknown, the gas mass flow rate. Iterating this equation gives both gas mass flow rate & $X_{LM}$ predictions. Using these values and known gas & liquid densities in equation 5 predicts the liquid mass low rate.

$$\phi_2(m_{g,apparent})_{PPL}/(m_{g,apparent})_{exp} = f_b(X_{LM}, DR, Fr_g) \quad (11)$$

$$X_{LM} = f_b^*(\phi_2, DR, Fr_g) = f_b^*\left(\phi_2, \frac{\rho_g}{\rho_l}, \frac{m_g}{A\sqrt{gD}}\sqrt{\frac{1}{\rho_g(\rho_l-\rho_g)}}\right) \quad (11a)$$

Method 3:

The PRR (or reciprocal) can be related to the $X_{LM}$, DR and the $Fr_g$ (see equation 12, where '$f_c$' is some data fitted function). Therefore, $X_{LM}$ can be predicted by re-arranging function '$f_c$' to '$f_c^*$', as shown as equation 12a. This term relates $X_{LM}$ to known parameters and a single unknown parameter, i.e. the gas mass flow rate. This expression can be combined with the traditional, expansion or PPL flow meter wet gas meter corrections (i.e. equation 9a, 9b or 9c respectively) to produce one equation with one unknown, the gas mass flow rate. Iterating this equation gives both gas mass flow rate & $X_{LM}$ predictions. Using these values and known gas & liquid densities in equation 5 predicts the liquid mass low rate.

$$PRR = f_c(X_{LM}, DR, Fr_g) \quad (12)$$

$$X_{LM} = f_c^*(PRR, DR, Fr_g) = f_c^*\left(\frac{\Delta P_r}{\Delta P_t}, \frac{\rho_g}{\rho_l}, \frac{m_g}{A\sqrt{gD}}\sqrt{\frac{1}{\rho_g(\rho_l-\rho_g)}}\right) \quad (12a)$$

Method 4:

The RPR (or reciprocal) can be related to can be related to the $X_{LM}$, DR and the $Fr_g$ (see equation 13, where '$f_d$' is some data fitted function). Therefore, $X_{LM}$ can be predicted by re-arranging function '$f_d$' to '$f_d^*$', as shown as equation 10a. This term relates $X_{LM}$ to known parameters and a single unknown parameter, i.e. the gas mass flow rate. This expression can be combined with the traditional, expansion or PPL flow meter wet gas meter corrections (i.e. equation 9a, 9b or 9c respectively) to produce one equation with one unknown, the gas mass flow rate. Iterating this equation gives both gas mass flow rate & $X_{LM}$ predictions. Using these values and known gas & liquid densities in equation 5 predicts the liquid mass low rate.

$$RPR = f_d(X_{LM}, DR, Fr_g) \quad (13)$$

$$X_{LM} = f_d^*(RPR, DR, Fr_g) = f_d^*\left(\frac{\Delta P_r}{\Delta P_{PPL}}, \frac{\rho_g}{\rho_l}, \frac{m_g}{A\sqrt{gD}}\sqrt{\frac{1}{\rho_g(\rho_l-\rho_g)}}\right) \quad (13a)$$

There are several advantages that can arise from the application of these Lockhart-Martinelli parameter prediction methods. These advantages include redundancy, improved sensitivities, an extended operating envelope and wet gas meter diagnostics.

A level of redundancy is achieved in a wet gas meter system that has not been present before. Present wet gas DP meters rely on one pair of DP's only to predict the liquid loading, e.g. $X_{LM}$, and hence the gas and liquid flow rates. If a DP transmitter becomes unserviceable, then the wet gas meter is unserviceable. However, with the three DPs being read, all six $X_{LM}$ predictions are available, including the four methods specified above. In this case any one DP transmitter becoming unserviceable does not take the overall wet gas metering system out of service. The remaining two DP transmitters allow their associated flow rate prediction ratio and DP ratio liquid loading predictions to be available.

For example, let us discuss a Venturi meter where the traditional ($\Delta P_t$) and PPL ($\Delta P_{PPL}$) DP's are read, but the recovered DP ($\Delta P_r$) is not read. The meter system uses the traditional DP reading with the traditional DP meter equation to produce a gas flow rate prediction, as discussed above:

$$m = f(\Delta P_t)$$

The wet gas flow causes the actual traditional DP with wet gas ($\Delta P_{tp}$) to be greater than the DP if the gas flowed alone ($\Delta P_t$), i.e. $\Delta P_{tp} > \Delta P_t$. Thus the traditional flow rate equation of the DP meter gives a gas flow rate prediction that has a positive bias, i.e.:

$$m_{g,apparent} = f(\Delta_{tp}).$$

A correction can be applied using the PLR vs. $X_{LM}$ relationship, lets call it PLR=$f_4(X_{LM}, DR, Fr_g)$ and a traditional DP meter wet gas correction factor (equation 9a).

$$OR_{trad} = \frac{m_{g,apparent}}{m_g} = f_1(X_{LM}, DR, Fr_g) \tag{9a}$$

Combining gives equation 14:

$$m_g = \frac{m_{g,apparent}}{OR_{trad}} = \frac{m_{g,apparent}}{f_5(PLR, DR, Fr_g)} \tag{14}$$

where $f_5$ is the function obtained by substituting PLR=$f_4$($X_{LM}$, DR, $Fr_g$) into equation 9a.

So what happens if there is a system malfunction? Let's say the DP transmitter reading the traditional DP fails. Let us say this transmitter becomes over-ranged, or 'saturated'. This is very common with wet gas flow applications. This means that the increase in traditional DP caused by wet gas flow has caused the DP to be incorrectly read. Here, the read DP, i.e. the DP transmitters maximum value ($\Delta P_{t,sat}$), is greater than the DP if the gas flowed alone ($\Delta P_t$), but less than the true DP ($\Delta P_{tp}$). That is:

$$\Delta P_{tp} > \Delta P_{t,sat} > \Delta P_t$$

The consequence of this is:

$$m_{g,apparent} > m_{g,saturated} > m_g$$

where $m_{g,apparent}$ denotes the gas flow rate prediction if the traditional DP was read correctly and $m_{g,saturated}$ denotes the gas flow rate prediction when the traditional DP transmitter is over-ranged or saturated.

Figure 10:
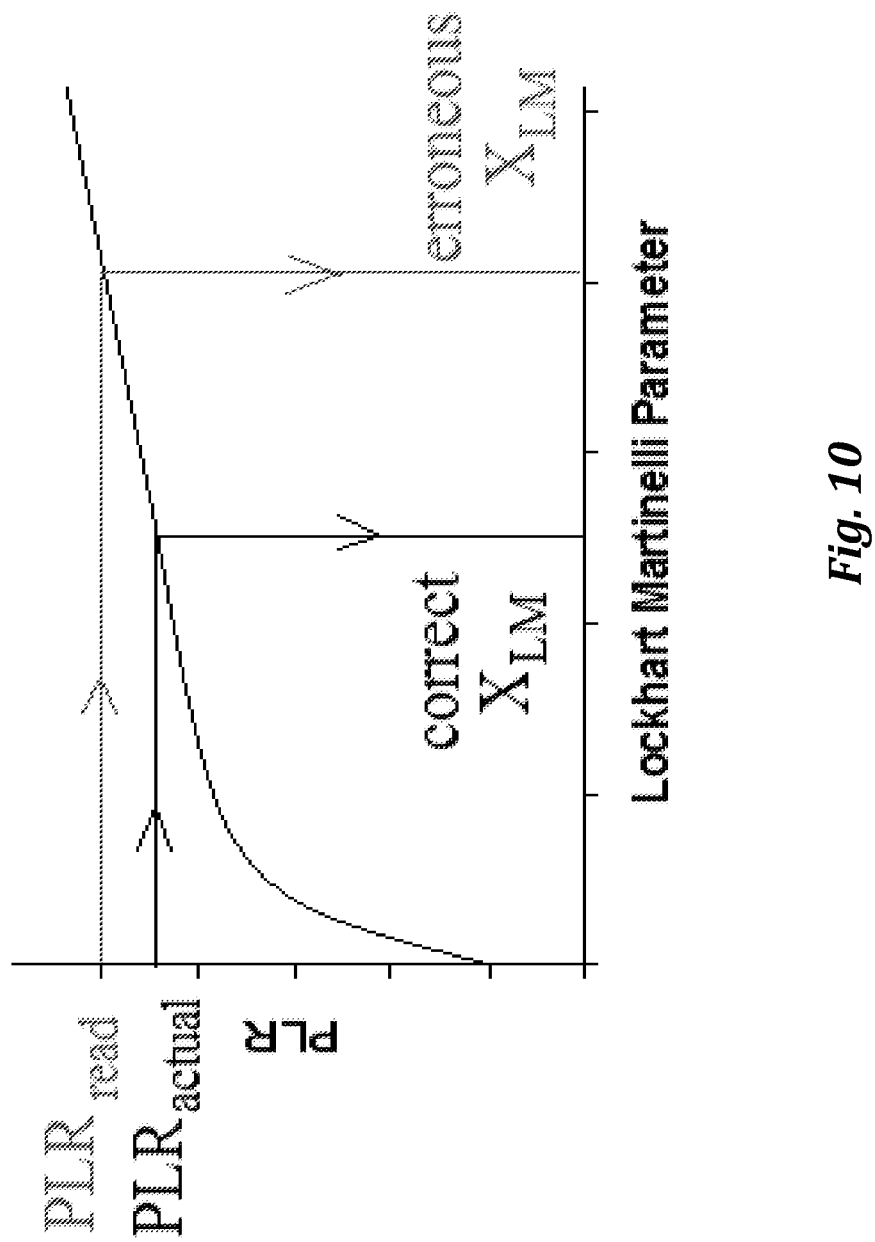
FIG. 10 shows a sketch of a Pressure Loss Ratio versus Lockhart Martinelli parameter, showing the error that results from an over-ranged (or 'saturated') traditional DP transmitter.

The $X_{LM}$ to correct for the wet gas over-reading is found by via the measured PLR. However, the measured PLR is incorrect. The traditional DP is under-read by the saturated DP transmitter. FIG. 10 shows the resulting problem of the traditional DP being read low by a saturated DP transmitter for a set pressure and gas flow rate. As $PLR_{wet} = \Delta P_{PPL,wet}/\Delta P_{tp}$ (where $\Delta P_{PPL,wet}$ denotes PPL when flow is wet) then as $\Delta P_{t,sat} < \Delta P_{tp}$ is low, measured PLR is too high, and $X_{LM}$ is over-estimated.

Therefore, in this case of a saturated traditional DP transmitter, equation 14 has too small a numerator (due to $m_{g,saturated} < m_{g,apparent}$) and too large a denominator (due to PLR being over predicted). The resulting gas flow rate prediction has a negative bias.

If only a PLR vs. $X_{LM}$ reading is made, then if a DP transmitter fails on these wet gas meters the system fails and the gas flow can not be measured correctly. There is not even any indication that the system has malfunctioned in any way. However, even if the operator somehow knew that a particular DP transmitter had malfunctioned there is still nothing that can be done to read the wet gas flow rate short of maintenance intervention. This is particularly troublesome if the meter is located in a remote location (e.g. an unmanned offshore platform, in the jungle or desert etc.) However, according to the present disclosure, further redundancy is provided so that a system malfunction can be detected and then a correct wet gas flow rate can be determined.

For example, if the diagnostic check '$x_4$' (described above) shows a DP reading error, and the saturated DP transmitter is identified from a check of actual DP to read DP, in this case the recovered & PPL DPs are still available. The two wet gas metering methods that use the recovered & PPL DPs are still available. Two of the sixth wet gas meter methods are still on line. That is, methods 2 & 4 (as described above) are both still available.

Similarly, as another example, if wet gas is being metered using the traditional and recovered DPs with the traditional and expansion meters respectively, and the recovered DP reading is for some reason lost, then according to the disclosure the traditional and PPL DPs are still available. The two wet gas metering methods that use the traditional & PPL DPs are still available. Two of the sixth wet gas meter methods are still on line. That is, the PLR vs $X_{LM}$ method and "method 1" (as described above) are both still available.

Likewise, as another example, if for some reason the PPL reading was lost, in this case the traditional and recovered DPs are still available. The two wet gas metering methods that use the traditional & recovered DPs are still available. Two of the six wet gas meter methods are still on line. That is, wet gas metering using the traditional and recovered DPs with the traditional and expansion meters respectively, and "method 3" (as described above) are both still available.

Utilizing all three DPs, instead of the current practice of using just two of the three DPs, and having more than one wet gas metering method available, instead of the current practice of having one method only, yields advantages.

Using up to six wet gas metering methods with three DPs achieves more than merely yielding five repeat calculations doing the same thing as the first primary chosen calculation method. Depending on what trouble the operator has with which DP transmitter (and DP transmitter trouble is common with wet gas flow) different pairs of calculation methods will become the useable methods. Therefore, the additional redundancy afforded by using multiple or all of the additional methods provides additional robustness against different types of DP transmitter failings.

Furthermore, as equation 4 holds with wet gas flow any two transmitters allow the third DP (i.e. the value that should have been read by an unserviceable DP transmitter) to be correctly inferred. This therefore allows all six liquid loading predictions to still be available if one of the three DP transmitters fail. This is a significant improvement on the current practice of using two DP's only and achieving one liquid loading prediction. Such redundancy is especially useful when the meter is in remote service, such as subsea or on an unmanned offshore platform.

Figure 11:
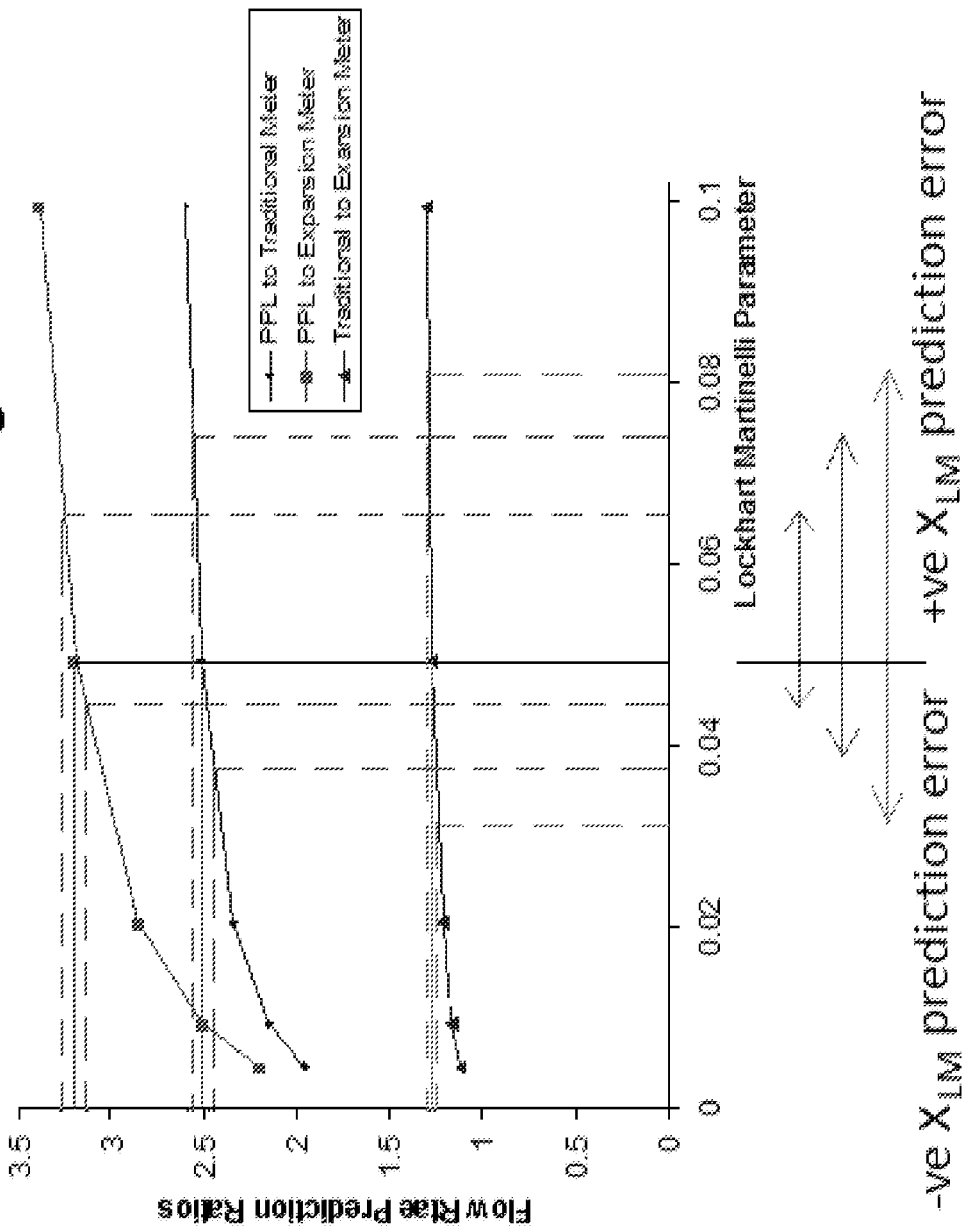
FIG. 11 shows the Lockhart Martinelli parameter versus gas flowrate prediction ratios for a six inch (15.24 cm), 0.7 beta ratio Venturi meter.

Different methods of predicting the liquid loading (e.g. $X_{LM}$) have different sensitivities to the flow rate prediction ratio or DP ratio uncertainties, making one method more accurate than another. FIG. 11 shows sample data from the six inch (15.24 cm), 0.7 beta ratio Venturi meter tested with wet gas flow as mentioned above. The data set is for a set DR (0.034) and set $Fr_g$ (1.7). It can be seen in this example that the three flow rate prediction ratios vs. $X_{LM}$ have different gradients (i.e. sensitivities).

Dry gas calibration of the meter showed that the traditional meter's uncertainty was 1%, the expansion meter's uncertainty 1% and the PPL meter's uncertainty was 2%. As such, each flow rate prediction ratio has an associated uncertainty. FIG. 11 shows the effect that each of these three uncertainties have on the $X_{LM}$ predictions. It can be seen that in this case the PPL to expansion meter flow rate prediction ratio's $X_{LM}$ prediction is the least sensitive (i.e. has a larger gradient) of the three methods to this input uncertainty. In turn, the PPL to traditional meter flow rate prediction ratio's $X_{LM}$ prediction is less sensitive to this input uncertainty than the traditional to expansion meter flow rate prediction ratio's $X_{LM}$ prediction. That is, here it can be seen that the two new methods disclosed here are more resistant to input uncertainties than the prior existing method.

Figure 12:
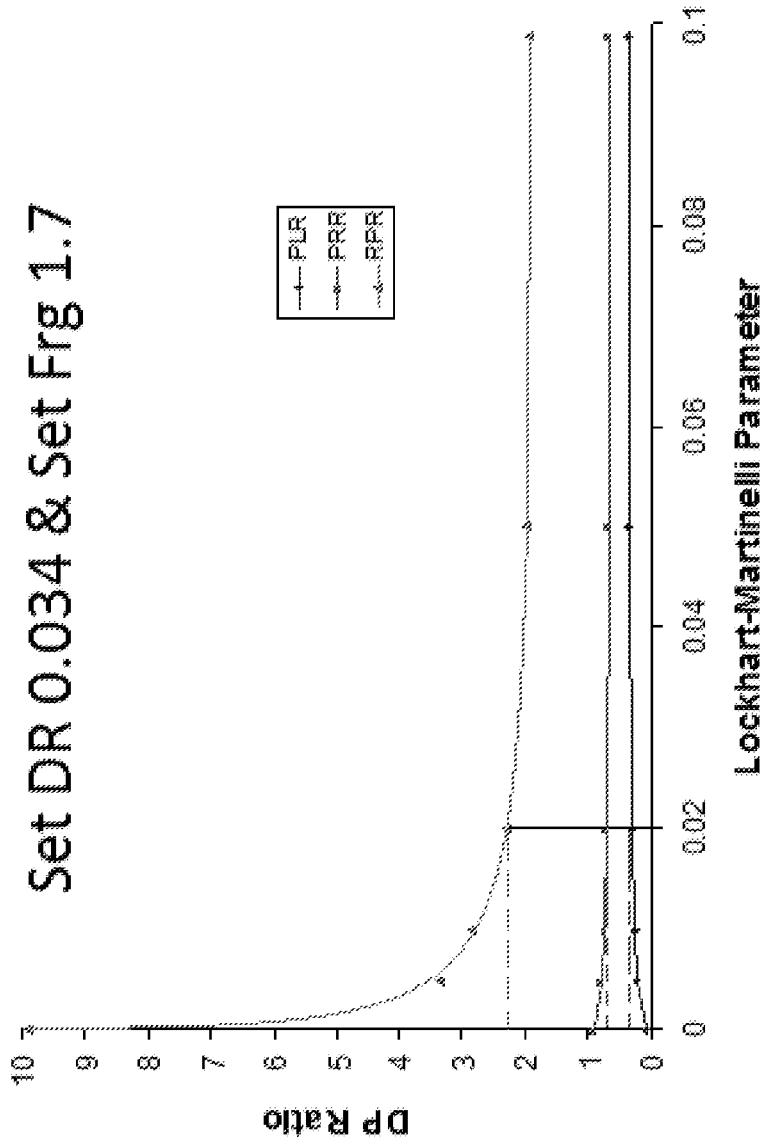
FIG. 12 shows the Lockhart Martinelli parameter versus DP Ratios for a six inch (15.24 cm), 0.7 beta ratio Venturi meter.

Dry gas calibration of the meter showed that the PLR uncertainty is 4%, the PRR uncertainty is 1% and the RPR uncertainty was 4%. FIG. 12 shows each DP ratio vs. $X_{LM}$ gradient. Whereas the gradients of the PLR & PRR were similar (although opposite, and as can be seen, the PLR gradient is slightly larger in magnitude than the PRR gradient), the gradient of the RPR to the $X_{LM}$ is noticeably steeper, i.e. more sensitive to liquid loading, especially at lower liquid loading values. Hence, the RPR liquid loading prediction is less sensitive/more resistant to uncertainties in the input RPR value than the other two DP ratios liquid loading predictions. Here, the RPR liquid loading prediction method is therefore less prone to giving substantial prediction errors than the other two DP ratio methods.

The six different liquid loading prediction methods do not all give the same liquid loading prediction uncertainty value (for example, see the comparison of three $X_{LM}$ prediction methods in FIG. 11). The liquid loading prediction method with the lowest uncertainty is dictated by meter design. This Venturi meter example is just that, an example. If we had chosen to look at data from another DP meter design, e.g. a cone, orifice, nozzle, wedge meter etc. the relative sensitivities of the different methods could be different.

Different DP meter designs exist in industry as they all have a niche, i.e. a combination of performance and cost specifications that makes a particular meter the best for a given application. For example: a Venturi meter is known to have a relatively high capital cost but a relatively low PPL, i.e. a low PLR, meaning a relatively low operating cost. Cone or wedge meters are known to have a moderate capital cost and a moderate PPL, i.e. a moderate PLR, meaning a moderate operating cost. An orifice meter is known to have a relatively low capital cost (especially as they don't need calibrated) but a relatively high PPL, i.e. a high PLR, meaning a relatively high operating cost. There are many other pros and cons to each DP meter design, but these stated above are the specifications relevant to this discussion.

Equation 4 is a physical rule that must hold true regardless of whether the flow is dry or wet gas flow. Therefore, for dry & wet gas flow we can re-write equation 4 as equation 4c.

$$1 = \frac{\Delta P_r}{\Delta P_t} + \frac{\Delta P_{PPL}}{\Delta P_t} = PRR + PLR \qquad (4c)$$

An increasing liquid loading produces an increasing PLR on any generic DP meter (for example, see FIG. 12). Therefore, with any generic DP meter, an increasing liquid loading produces not only an increasing PLR, but also a reducing PRR (and by consequence a reducing RPR).

The sensitivities of these three DP ratios to liquid loading is dependent on the DP meter's single phase performance. Note, that equations 4 & 4c hold for all generic DP meters in dry & wet gas flow. It is not possible to lose more than 100% of the traditional DP ($\Delta P_t$) the DP meter creates. Therefore, even with wet gas flow no PLR value can exceed unity. This can also be stated as no PRR can be less than zero. This is a natural boundary condition which dictates the wet gas flow sensitivity of a generic DP meter's diagnostic parameters.

Figure 13:
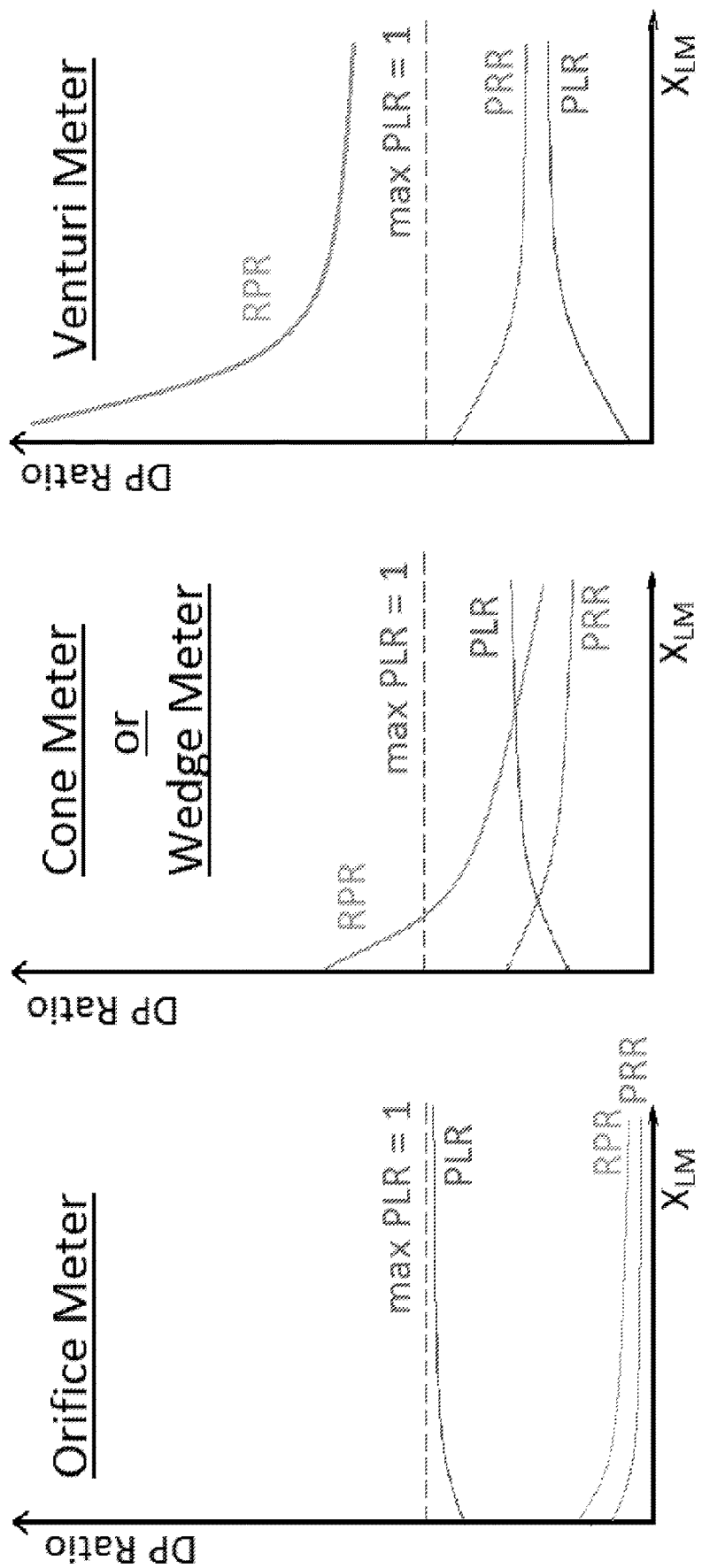
FIG. 13 shows a sketch of a comparison of different DP meters' DP ratio sensitivities to wet gas flow.

FIG. 13 shows a sketch comparing different DP Meter designs' DP Ratio sensitivities to wet gas flow. With dry gas flow the orifice meter has a high PLR value, and therefore low PRR & RPR values. Therefore, when liquid loading/$X_{LM}$ increases, an orifice meter's PLR can only rise by a relatively small amount as PLR of unity is the limit. Likewise, the orifice meter PRR & RPR only reduces by a small amount. With dry gas flow the Venturi meter has a low PLR value, and therefore high PRR & RPR values. With increasing liquid loading/$X_{LM}$, a Venturi meter's PLR can, and does, rise significantly and not encroach on the limit of unity. Likewise, the PRR & RPR also change significantly with liquid loading/$X_{LM}$. FIG. 12 shows real Venturi meter data showing this. DP meters with moderate dry gas PLR values (e.g. cone & wedge meters) have DP ratio responses to wet gas flow that are between the orifice & Venturi meter DP ratio responses.

Hence, the design of a DP meter dictates its dry gas PLR and this dictates the DP meter's DP ratio sensitivities to wet gas flow. Predicting which DP ratio for which DP meter is most sensitive to wet gas (and therefore most useful) is complex. Even within a given DP meter type, e.g. orifice meter, the sensitivities can be affected by geometry, e.g. the beta ratio. Furthermore, along with different DP ratio vs. liquid loading/$X_{LM}$ gradients, which DP ratio is the best diagnostic parameter to monitor wet gas can also be affected by the relative uncertainties of the three DP readings (see FIG. 1). The same arguments can be made for other DP meter diagnostic parameters: the flow rate prediction pairs, sensitivity to wet gas flow.

Therefore, for different DP meter designs and geometries, different diagnostic parameters can be found to more useful for use with wet gas flow than others. Therefore, all six DP meter diagnostic parameters are useful with wet gas flow, but which parameters are the best, i.e. predict liquid loading/$X_{LM}$ with the least uncertainty, depends on several factors that are meter type & application dependent. Therefore, it is useful to measure multiple, or all of the, diagnostic parameters discussed above to provide robust meter monitoring and accuracy for a wide variety of possible problems that may arise.

Not all six methods of predicting liquid loading/$X_{LM}$ have the same upper limit of liquid loading/$X_{LM}$. It is clear in FIGS. 11 and 12 that three of the four methods specified above operate over a wider range of liquid loading/$X_{LM}$ than has been possible before. For example, in FIG. 11, both the PPL to Traditional meter flow rate prediction ratio & the PPL to Expansion meter flow rate prediction ratio have a relationship with liquid loading/$X_{LM}$ that extends beyond that of the traditional to expansion meter flow rate prediction ratio vs. $X_{LM}$ relationship.

With different methods of predicting liquid loading/$X_{LM}$ there is now the ability to cross reference the outputs creating basic wet gas DP meter diagnostics. If the different liquid loading/$X_{LM}$ predictions do not agree within the combined system uncertainties then the system is shown to have a malfunction. If we denote each of the six liquid loading/$X_{LM}$ prediction methods with the subscript 1 to 6 and denote each methods prediction uncertainty as a*%, b*%, c*%, d*%, e*% & f*% respectively, then for a serviceable meter we should see the following:

$$(X_{LM})_1 \pm a*\% = (X_{LM})_2 \pm b*\% = (X_{LM})_3 \pm c*\% = (X_{LM})_4 \pm d*\% = (X_{LM})_5 \pm e*\% = (X_{LM})_6 \pm f*\%$$

There are various ways of comparing these liquid loading/$X_{LM}$ predictions, but all are manifestations of the concept of comparing the different liquid loading/$X_{LM}$ predictions to check the health of the wet gas DP meter.

It will be appreciated that the measurements for the wet gas diagnostic techniques described in FIGS. 9 to 13 may originate from a "dedicated fluid channel" type DP meter such as illustrated in FIG. 2.

Various improvements and modifications can be made to the above without departing from the scope of the disclosure.

What is claimed is:

1. A method of metering flow through a fluid conduit having a fluid obstruction means, the method comprising:
   measuring a permanent pressure loss (PPL) differential pressure taken between a position upstream of the fluid obstruction means and a position downstream of the fluid obstruction means;
   measuring a traditional differential pressure taken between the position upstream of the fluid obstruction means and an intermediate position between the upstream and downstream positions;
   measuring a recovered differential pressure taken between the intermediate position and the downstream position;
   deriving a signal variation parameter for each of the three measured differential pressures;
   comparing each of the three derived signal variation parameters with historical values, with each other or against their respective maximum thresholds;
   identifying any differential pressure measurement for which the associated signal variation parameter has a magnitude greater than an expected maximum threshold;
   evaluating the trustworthiness of the differential pressure measurement based on an associated signal variation parameter; and
   calculating a fluid flow rate through the fluid conduit based on one or more of the differential pressure measurements that are identified as reliable trustworthy.

2. The method of claim 1, comprising monitoring each of the permanent pressure loss differential pressure, the traditional differential pressure, and the recovered differential pressure through repeated differential pressure measurements.

3. The method of claim 1, wherein the signal variation parameter comprises a standard deviation.

4. The method of claim 1, wherein each differential pressure measurement is derived by comparing the pressures of a first dedicated fluid channel formed between a first pressure port of a DP transmitter and a first fluid conduit pressure port and a second dedicated fluid channel formed between a second pressure port of a DP transmitter and a second fluid conduit pressure port.

5. The method of claim 4, wherein a differential pressure measurement is identified as trustworthy if it is not identified as having an associated signal variation parameter that is greater than an expected maximum value or variance based on the comparison.

6. The method of claim 1, wherein the fluid conduit comprises three pressure ports which are each coupled with pressure ports of two different DP transmitters.

7. The method of claim 6, comprising:
   measuring said PPL differential pressure with a first DP transmitter comprising a first pressure port coupled with an upstream fluid conduit pressure port and a second pressure port coupled with a downstream fluid conduit pressure port;
   measuring said traditional differential pressure with a second DP transmitter comprising a first pressure port coupled with said upstream fluid conduit pressure port and a second pressure port coupled with an intermediate fluid conduit pressure port; and
   measuring said recovered differential pressure with a third DP transmitter comprising a first pressure port coupled with said intermediate fluid conduit pressure port and a second pressure port coupled with said downstream fluid conduit pressure port.

8. The method of claim 7, wherein, if two of the three differential pressure measurements are identified as having a greater than expected signal variation parameter, then the fluid conduit pressure port that is shared between the two DP transmitters that measure those two differential pressure measurements is identified as being blocked.

9. The method of claim 1, wherein a differential pressure measurement is identified as trustworthy if it is not identified as having an associated signal variation parameter that is greater than the expected maximum value.

10. The method of claim 1, wherein, if all three of the differential pressure measurements are identified as having a greater than expected signal variation parameter, the fluid flow is identified as being a wet gas flow.

11. A differential pressure (DP) meter system, comprising:
   a fluid conduit comprising a fluid obstruction and a plurality of pressure ports;
   a first DP transmitter for measuring a permanent pressure loss (PPL) differential pressure taken between a position upstream of the fluid obstruction and a position downstream of the fluid obstruction;
   a second DP transmitter for measuring a traditional differential pressure taken between the position upstream of the fluid obstruction and an intermediate position between the upstream and downstream positions;
   a third DP transmitter for measuring a recovered differential pressure taken between the intermediate position and the downstream position; and
   a calculation device for:
      deriving a signal variation parameter for each of the three measured differential pressures;
      comparing each of three derived signal variation parameters with historical values, with each other or against their respective maximum thresholds;

identifying any differential pressure measurement for which the associated signal variation parameter has a magnitude greater than an expected maximum threshold;

evaluating the trustworthiness of the differential pressure measurement based on an associated signal variation parameter; and calculating a fluid flow rate through the fluid conduit based on one or more of the differential pressure measurements that are identified as trustworthy.

12. The system of claim 11, wherein the calculation device monitors each of the permanent pressure loss differential pressure, the traditional differential pressure, and the recovered differential pressure through repeated differential pressure measurements.

13. The system of claim 12, wherein the calculation device comprises storage for logging repeated measurements to thereby establish a data set of the differential pressures over time.

14. The system of claim 11, wherein the signal variation parameter is a standard deviation.

15. The system of claim 11, wherein each DP transmitter comprises a first pressure port and a second pressure port; and each DP transmitter port is coupled to one fluid conduit pressure port to form a dedicated fluid channel.

16. The system of claim 11, wherein a differential pressure measurement is identified as trustworthy if it is not identified as having an associated signal variation parameter that is greater than an expected maximum value or variance based on the comparison, and a fluid flow rate is calculated on the basis of one or more of the differential pressure measurements that are identified as trustworthy.

17. The system of claim 11, wherein the fluid conduit comprises three pressure ports which are each coupled with pressure ports of two different DP transmitters.

18. The system of claim 17, comprising:
a first DP transmitter for measuring said PPL differential pressure and comprising a first pressure port coupled with an upstream fluid conduit pressure port and a second pressure port coupled with a downstream fluid conduit pressure port;
a second DP transmitter for measuring said traditional differential pressure and comprising a first pressure port coupled with said upstream fluid conduit pressure port and a second pressure port coupled with an intermediate fluid conduit pressure port; and
a third DP transmitter for measuring said recovered differential pressure and comprising a first pressure port coupled with said intermediate fluid conduit pressure port and a second pressure port coupled with said downstream fluid conduit pressure port.

19. The system of claim 18, wherein, if two of the three differential pressure measurements are identified as having a greater than expected signal variation parameter, then the fluid conduit pressure port that is shared between the two DP transmitters that measure those two differential pressure measurements is identified as being blocked.

20. The system of claim 11, wherein a differential pressure measurement is identified as trustworthy if it is not identified as having an associated signal variation parameter that is greater than the expected maximum value, and a fluid flow rate is calculated on the basis of one differential pressure measurement that is identified as trustworthy.

21. The system of claim 11, wherein, if all three of the differential pressure measurements are identified as having a greater than expected signal variation parameter, the fluid flow is identified as being a wet gas flow.

22. A non-transitory computer readable medium encoded with a computer program product for metering flow through a fluid conduit having a fluid obstruction means, the non-transitory computer program product comprising instructions that, when run on a flow computer with a non-transitory readable storage medium comprising a set of instructions stored therein which, when executed by a processor, enable said flow computer to:
receive electronic signals representative of differential pressure measurements that include a first measured differential pressure of a permanent pressure loss (PPL) differential pressure taken between a position upstream of the fluid obstruction means and a position downstream of the fluid obstruction means, a second measured differential pressure of a traditional differential pressure taken between the position upstream of the fluid obstruction means and an intermediate position between the upstream and downstream positions, and a third measured differential pressure of a recovered differential pressure taken between the intermediate position and the downstream position;
derive a signal variation parameter for each of the three measured differential pressures;
compare each of the three derived signal variation parameters with historical values, with each other or against their respective maximum thresholds;
identify any differential pressure measurement for which the associated signal variation parameter has a magnitude greater than an expected maximum threshold;
evaluate the trustworthiness of the differential pressure measurement based on an associated signal variation parameter; and
calculate a fluid flow rate through a fluid conduit based on one or more of the differential pressure measurements that are identified as trustworthy.

23. A flow computer for metering flow through a fluid conduit having a fluid obstruction means, the flow computer having a non-transitory computer readable medium encoded with a set of instructions which, when executed by a processor, cause the flow computer to:
receive electronic signals representative of differential pressure measurements that include a first measured differential pressure of a permanent pressure loss (PPL) differential pressure taken between a position upstream of the fluid obstruction means and a position downstream of the fluid obstruction means, a second measured differential pressure of a traditional differential pressure taken between the position upstream of the fluid obstruction means and an intermediate position between the upstream and downstream positions, and a third measured differential pressure of a recovered differential pressure taken between the intermediate position and the downstream position;
derive a signal variation parameter for each of the three measured differential pressures;
compare each of the three derived signal variation parameters with historical values, with each other or against their respective maximum thresholds;
identify any differential pressure measurement for which the associated signal variation parameter has a magnitude greater than an expected maximum threshold;
evaluate the trustworthiness of the differential pressure measurement based on an associated signal variation parameter; and calculate a fluid flow rate through a fluid conduit based on one or more of the differential pressure measurements that are identified as trustworthy.

\* \* \* \* \*